US008017705B2

(12) United States Patent
Yamaguchi et al.

(10) Patent No.: US 8,017,705 B2
(45) Date of Patent: Sep. 13, 2011

(54) PROCESS FOR PRODUCTION OF SYNDIOTACTIC PROPYLENE POLYMER

(75) Inventors: Tomohiro Yamaguchi, Kuga-gun (JP); Junpei Tanaka, Hatsukaichi (JP); Shiro Otsuzuki, Kawasaki (JP); Yasushi Tohi, Otake (JP); Kouji Nagahashi, Iwakuni (JP); Nobukazu Yamahira, Kuga-gun (JP); Shigenobu Ikenaga, Ichihara (JP); Sunil Krzysztof Moorthi, Ichihara (JP); Kazunori Kamio, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 65 days.

(21) Appl. No.: 12/312,483

(22) PCT Filed: Nov. 16, 2007

(86) PCT No.: PCT/JP2007/072327
§ 371 (c)(1),
(2), (4) Date: May 13, 2009

(87) PCT Pub. No.: WO2008/059974
PCT Pub. Date: May 22, 2008

(65) Prior Publication Data
US 2010/0069588 A1   Mar. 18, 2010

(30) Foreign Application Priority Data
Nov. 17, 2006  (JP) .................... 2006-312051

(51) Int. Cl.
C08F 4/64      (2006.01)
C08F 4/642     (2006.01)
C08F 4/6592    (2006.01)
C08F 110/06    (2006.01)
B01J 31/22     (2006.01)

(52) U.S. Cl. ........ 526/160; 526/165; 526/351; 526/943
(58) Field of Classification Search .................. 526/160, 526/165, 351, 943
See application file for complete search history.

(56) References Cited

U.S. PATENT DOCUMENTS

| | | | |
|---|---|---|---|
| 3,280,091 A | 10/1966 | Dance | |
| 4,960,878 A | 10/1990 | Crapo et al. | |
| 4,990,640 A | 2/1991 | Tsutsui et al. | |
| 5,232,992 A * | 8/1993 | Asanuma et al. | 525/240 |
| 5,401,817 A | 3/1995 | Palackal et al. | |
| 5,525,690 A | 6/1996 | Chien et al. | |
| 5,571,880 A | 11/1996 | Alt et al. | |
| 5,663,268 A | 9/1997 | Winter et al. | |
| 6,121,395 A | 9/2000 | Turner | |
| 6,342,568 B1 * | 1/2002 | Sunaga et al. | 526/160 |
| 6,420,516 B1 * | 7/2002 | Tau et al. | 528/501 |
| 6,515,086 B1 | 2/2003 | Razavi | |
| 6,632,885 B2 * | 10/2003 | Morizono et al. | 525/191 |
| 6,894,132 B2 | 5/2005 | Razavi | |
| 7,335,711 B2 * | 2/2008 | Marin et al. | 526/160 |
| 7,449,533 B2 | 11/2008 | Kawai et al. | |
| 7,799,882 B2 * | 9/2010 | Jiang et al. | 526/206 |
| 2003/0114608 A1 | 6/2003 | Tharappel et al. | |
| 2006/0270812 A1 | 11/2006 | Tohi et al. | |
| 2007/0043183 A1 * | 2/2007 | Marin et al. | 526/127 |
| 2009/0043050 A1 | 2/2009 | Ikenaga et al. | |

FOREIGN PATENT DOCUMENTS

| | | |
|---|---|---|
| JP | 42-2596 | 2/1967 |
| JP | 01-501950 A | 7/1989 |
| JP | 02-024701 A | 1/1990 |
| JP | 02-167305 A | 6/1990 |
| JP | 03-103407 A | 4/1991 |
| JP | 04-080214 A | 3/1992 |
| JP | 05-209019 A | 8/1993 |
| JP | 07-138275 A | 5/1995 |
| JP | 7-138275 A | 5/1995 |
| JP | 07-278169 A | 10/1995 |
| JP | 7-278169 A | 10/1995 |
| JP | 08-67713 A | 3/1996 |
| JP | 2000-212194 A | 8/2000 |
| JP | 2002-510358 A | 4/2002 |
| JP | 2002-145910 A | 5/2002 |
| JP | 2005-314680 A | 11/2005 |
| JP | 2007-302854 A | 11/2007 |
| WO | WO 01/19877 A1 | 3/2001 |
| WO | WO 01/27124 A1 | 4/2001 |
| WO | WO 2004/087775 A1 | 10/2004 |

OTHER PUBLICATIONS

Ewen et al., "Syndiospecific Propylene Polymerizations with Group 4 Metallocenes", J. Am. Chem. Soc., 1988, 110:6255-6256.
Yaws, Carl L., "Solubility parameter, liquid volume, and van der waals area and volume", Chemical Properties Handbook, 1999, Chapter 14, McGraw-Hill., 341-358.
Chen et al., "Silylene-bridged fluorenyl-containing ligands and zirconium complexes with $C_1$ and $C_S$ symmetry: general synthesis and olefin polymerization catalysis", J. of Organ. Chem., 1995, 497:1-9.
Chen et al., "Silylene-bridged fluorenyl-containing ligands and zirconium complexes with $C_1$ and $C_2$ symmetry: general synthesis and olefin polymerization catalysis", Journal of Organometallic Chemistry, 1995, Jul. 26, 1995, vol. 497, Nos. 1 to 2, pp. 1 to 9.
Korean Office Action in Appln No. 10-2009-7012487 dated Mar. 17, 2011.

* cited by examiner

*Primary Examiner* — Caixia Lu
(74) *Attorney, Agent, or Firm* — Foley & Lardner LLP

(57) ABSTRACT

Disclosed is a method for producing a syndiotactic propylene polymer having a syndiotactic pentad fraction (rrrr fraction) of not less than 85%, a melting point (Tm) within the range of 145-170° C. and a limiting viscosity [η] within the range of 0.1-10 dl/g by a solution polymerization method using a group 4 crosslinked metallocene compound, which is not accompanied by precipitation of a polymer (excluding white turbidity). Also disclosed is a production method which enables to continuously perform such a production.

13 Claims, 1 Drawing Sheet

[Figure 1]
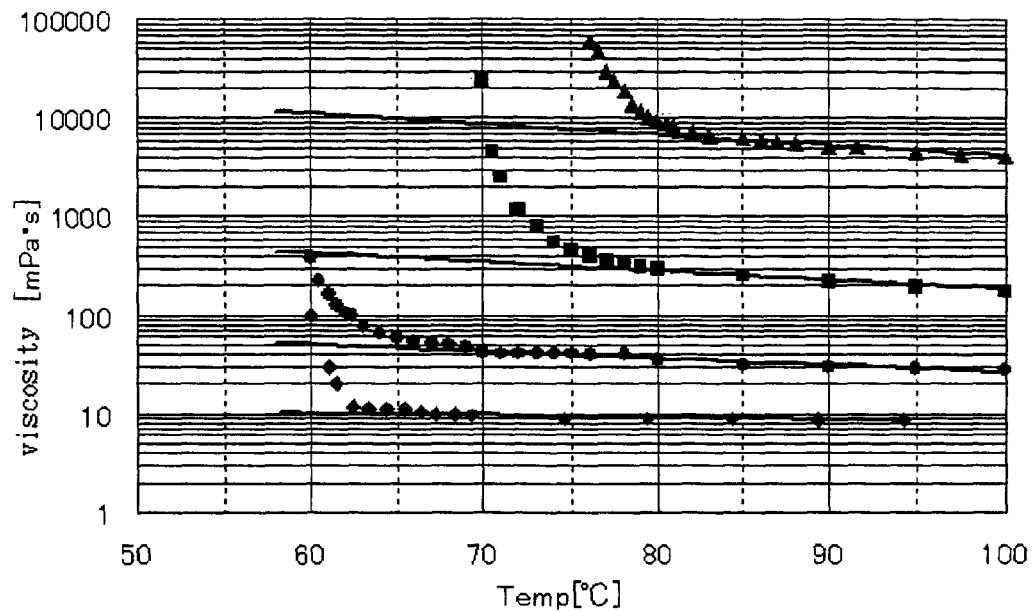
[Figure 2]
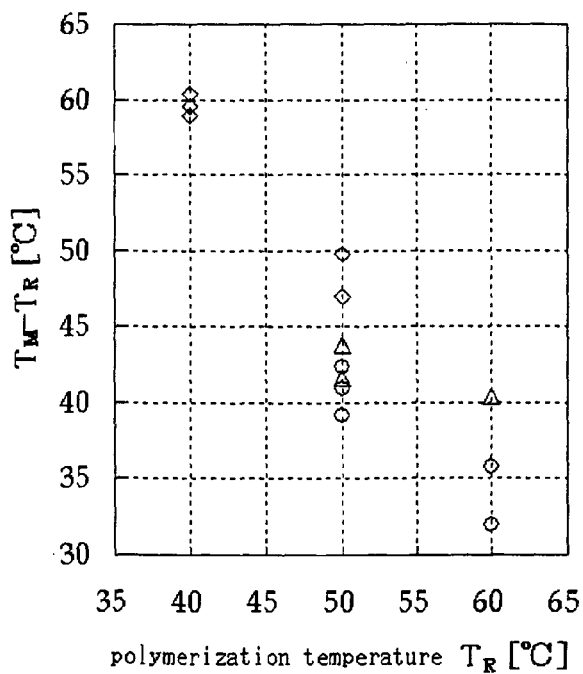

PROCESS FOR PRODUCTION OF SYNDIOTACTIC PROPYLENE POLYMER

TECHNICAL FIELD

The present invention relates to a process for producing a syndiotactic propylene polymer by solution polymerizing propylene singly or monomers, in which propylene is contained as an essential component, in a specific solvent in the presence of a catalyst containing a metallocene compound in a specific temperature range.

TECHNICAL BACKGROUND

Syndiotactic polypropylene has high transparency and surface gloss and also excellent flexibility as compared with conventional isotactic polypropylene. Therefore, it is desired that the syndiotactic propylene is used for new uses in which conventional isotactic polypropylene cannot be used, in addition to uses such as films, sheets, fibers, injection molded products and blow molded products that are known to be the uses of conventional isotactic polypropylene.

It is conventionally known that syndiotactic polypropylene can be produced by a method of polymerization at a low temperature using a catalyst made from a vanadium compound and an organoaluminum compound. In the conventional method, however, the obtained polymers do not exhibit sufficient properties because the polymer does not have sufficient high syndiotacticity and sufficient high melting point.

Under the circumstances, a method for producing syndiotactic polypropylene using a polymerization catalyst comprising a metallocene compound in order to enhance syndiotacticity has been studied hard. For example, J. A. Ewen and others disclose a method of polymerizing propylene syndiospecifically using a catalyst comprising isopropyl(cyclopentadienyl-1-fluorenyl)hafnium dichloride and aluminoxane (Non-patent document 1). JP-A-H4 (1992)-80214 (Patent document 1) discloses that polypropylene having high syndiotacticity can be produced using, as a catalyst, a metallocene compound with a specific structure having two transition metal atoms in the molecule. JP-A-H5 (1993)-209019 (Patent document 2) discloses a method that a syndiotactic propylene copolymer is produced using a catalyst comprising a specific aluminoxane and a metallocene compound typified by [phenyl(methyl)methylene](9-fluorenyl) (cyclopentadienyl)hafnium dichloride, at a temperature of from −40 to 150° C. in a solution, in a suspension or in a gas phase. JP-A-H8 (1996)-67713 (Patent document 3) discloses that a method of producing syndiotactic polypropylene using, as a co-catalyst, a borate and a metallocene compound such as rac-2,2-dimethyldimethylpropylidene(1-η$^5$-cyclopentadienyl)(1-η$^5$-fluorenyl)dichlorozirconium, in a diluted hydrocarbon suspension. WO01/19877 (Patent document 4) discloses a method of producing syndiotactic polypropylene using a polymerization catalyst comprising a metallocene compound having a specific structure and methyl aluminoxane in the pamphlet. Moreover, JP-A-2002-510358 (Patent document 5) discloses a method of producing syndiotactic polypropylene by propylene bulk polymerization using, as a catalyst, isopropylidene (cyclopentadienyl) (3,6-di-tert-butylfluorenyl) zirconium dichloride and methyl aluminoxane in Example 11.

Any of the above known techniques does not disclose a process for producing syndiotactic polypropylene having high stereoregularity (syndiotacticity) and high melting point by solution polymerization in an industrial scale.

Patent Document 1: JP-A-H4 (1992)-080214
Patent Document 2: JP-A-H5 (1993)-209019
Patent Document 3: JP-A-H8 (1996)-067713
Patent Document 4: Pamphlet of WO01/019877
Patent Document 5: JP-A-2002-510358
Non-Patent Document 1: J. Am. Chem. Soc. 1988, 110, 6255

DISCLOSURE OF THE INVENTION

Problems to be Solved by the Invention

The present invention was made in order to solve the above subjects. It is an object of the present invention to provide a process for producing a syndiotactic propylene polymer with high polymerization activity efficiently by a solution polymerization method without deposition of polymers excluding a state of white turbidity of solution, and a production process capable of conducting the above production continuously, provided that these processes could not be attained conventionally.

Means for Solving the Problems

Under the circumstances, the present inventors have been earnestly studied on a process for efficiently producing a propylene polymer having high syndiotacticity and a high melting point, which has been desired to contribute to plastic industries greatly. As a result, they found that when an α-olefin such as propylene is solution polymerized in a specific solvent in a specific temperature range using an olefin polymerization catalyst comprising a specific metallocene catalyst, a syndiotactic propylene polymer having high syndiotacticity, a high melting point and a sufficiently high molecular weight can be solution polymerized with good polymerization activity without deposition of polymers excluding a state of white turbidity in polymerization, not only at ordinary temperature but also in a high temperature range suitable for industrial scales, and the polymer can be also produced continuously. Thus, the present invention has been accomplished.

That is, the present invention relates to:

a process for producing a syndiotactic propylene polymer having a syndiotactic pentad fraction (rrrr fraction), as measured by $^{13}$C-NMR, of at least 85%, a melting point ($T_m$), as measured by DSC, of from 145° C. to 170° C., and an intrinsic viscosity [η] of 0.1 to 10 dl/g, which process comprises a step ($P_1$) of solution polymerizing a propylene singly or at least one monomer selected from a propylene, ethylene and an α-olefin having 4 to 10 carbon atoms at a polymerization temperature ($T_R$) of from 30° C. to 250° C. in the presence of an olefin polymerization catalyst which comprises;
(A) a bridged metallocene compound represented by the following formula (I), and
(B) at least one compound selected from
  (b-1) an organoaluminum oxy compound,
  (b-2) a compound capable of forming an ion pair by reaction with the metallocene compound (A), and
  (b-3) an organoaluminum compound.

[Chem. 1]

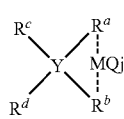

(I)

In the formula (I), M is a titanium atom, a zirconium atom or a hafnium atom, Q is selected from a halogen atom, a hydrocarbon group, an anion ligand and a neutral ligand coordinatable with a lone electron pair, j is an integer of 1 to 4, $R^a$ and $R^b$ may be identically or differently a single nuclear or polynuclear hydrocarbon residue capable of forming a sandwich structure together with M, Y is a carbon atom or a silicon atom, and $R^c$ and $R^d$ may be the same or different from each other, is selected from hydrogen, a hydrocarbon group and a silicon atom-containing group and further may be bonded each other to form a ring.

EFFECT OF THE INVENTION

According to the process for producing the syndiotactic propylene polymer of the present invention, when propylene is solution polymerized singly, or α-olefins in which propylene is contained as an essential component and are solution polymerized in a specific solvent in a specific temperature range in the presence of a catalyst comprising a specific metallocene compound, an α-olefin polymer having high syndiotacticity, a high melting point and a sufficiently high molecular weight can be prepared with good polymerization activity at not only ordinary temperature but also high temperatures.

According to the process for producing the syndiotactic propylene polymer of the present invention, since solution polymerization can proceed without deposition of polymers excluding a state of white turbidity of solution, the continuous production thereof can be performed.

BRIEF DESCRIPTION OF THE DRAWING

FIG. 1 is an example showing the relation of the polymer concentration, the temperature and the solution viscosity of a solution of the solvent A of syndiotactic polypropylene.

FIG. 2 is a graph that a temperature difference between an equilibrium melting temperature ($T_M$) and a solution polymerization temperature ($T_R$) is plotted to the $T_R$ with respect to Examples 1 to 8 and Comparative Examples 1 to 5. In the graph, the meanings of the marks are as follows. ◇: a polymer deposited during the solution polymerization. ∆: a fine polymer deposited during the solution polymerization and the solution turned into a white-turbidity state. ○: the solution polymerization proceeded in a uniform state.

BEST MODE FOR CARRYING OUT THE INVENTION

The process for producing a syndiotactic propylene polymer according to the present invention is a process for producing a syndiotactic propylene polymer having a syndiotactic pentad fraction (rrrr fraction), as measured in $^{13}$C-NMR, of at least 85%, a melting point (Tm), as measured in DSC, of from 145° C. to 170° C., and an intrinsic viscosity [η] of 0.1 to 10 dl/g, which process comprises a step ($P_1$) of solution polymerizing propylene singly or propylene and at least one monomer selected from ethylene and an α-olefin having 4 to 10 carbon atoms at a polymerization temperature ($T_R$) of from 30° C. to 250° C. in the presence of an olefin polymerization catalyst which comprises;

(A) a bridged metallocene compound represented by the following formula (I), and
(B) at least one compound selected from
   (b-1) an organoaluminum oxy compound,
   (b-2) a compound capable of forming an ion pair by reaction with the metallocene compound (A), and
   (b-3) an organoaluminum compound.

[Chem. 2]

In the formula (I), M is a titanium atom, a zirconium atom or a hafnium atom, Q is selected from a halogen atom, a hydrocarbon group, an anion ligand and a neutral ligand coordinatable with a lone electron pair, j is an integer of 1 to 4, $R^a$ and $R^b$ may be identically or differently a single nuclear or polynuclear hydrocarbon residue capable of forming a sandwich structure together with M, Y is a carbon atom or a silicon atom, and $R^c$ and $R^d$ may be the same or different from each other, is selected from hydrogen, a hydrocarbon group and a silicon atom-containing group and further may be bonded each other to form a ring.

The production process of the present invention is characterized in that the above polymerization step ($P_1$) is preferably carried out continuously, and following the polymerization step ($P_1$), a post-treatment step ($P_2$) is carried out in such a way that the polymerization solution transferred from the polymerization step is optionally heated to the temperature not lower than the polymerization temperature and not higher, than 250° C., and a flash procedure is carried out at a pressure of from 0.00 to 0.5 MPaG to distill away the solvent.

With respect to the two steps for constituting the process for producing the syndiotactic propylene polymer of the present invention, namely the solution polymerization step ($P_1$) and the post treatment step ($P_2$) subsequently performed after the solution polymerization step, the best mode for carrying out the present invention is described. Thereafter, the properties of the syndiotactic propylene polymer obtainable by the production process of the present invention will be described.

[1] Solution Polymerization Step ($P_1$)

With respect to the step which is essential and constitutes the process for producing the syndiotactic propylene polymer of the present invention, namely the solution polymerization step ($P_1$), the best mode for carrying out the present invention will be described together with the description of the polymerization catalyst for carrying out the step, the solution polymerization method in the presence of the polymerization catalyst, and the properties of a polymer obtainable by the solution polymerization, in this order.

[1-1] Polymerization Catalyst

The polymerization catalyst of the present invention comprises (A) a metallocene compound, and (B) at least one compound selected from (b-1) an organoaluminum oxy compound, (b-2) a compound capable of forming an ion pair by reacting with the metallocene compound (A), and (b-3) an organoaluminum compound. [In the following description, (A) the metallocene compound is simply referred to as "(A) component" or "metallocene compound", and (B) at least one compound selected from (b-1) the organoaluminum oxy compound, (b-2) the compound capable of forming an ion pair by reacting with the metallocene compound (A), and (b-3) the organoaluminum compound is simply referred to as "(B) component", "co-catalyst" or "co-catalyst component".]

(A) Bridged Metallocene Compound

The bridged metallocene compound of the present invention is a bridged metallocene compound represented by the formula (I). In the formula (I), M is a titanium atom, a zirconium atom or a hafnium atom, Q is selected from a halogen atom, a hydrocarbon group, an anion ligand and a neutral ligand coordinatable with a lone electron pair, j is an integer of 1 to 4, $R^a$ and $R^b$ may be identically or differently a single nuclear or polynuclear hydrocarbon residue capable of forming a sandwich structure together with M, Y is a carbon atom or a silicon atom, and $R^c$ and $R^d$ may be the same or different from each other, and is an atom or substituent selected from hydrogen, a hydrocarbon group and a silicon atom-containing group.

Among the bridged metallocene compounds represented by the formula (I), from the viewpoint of their polymerization properties, availability, and excellent properties of the obtainable polymer, metallocene compounds having Cs symmetry to a center atom M are preferred, and further, a bridged metallocene compound represented by the following formula (II) is preferably used.

[Chem. 3]

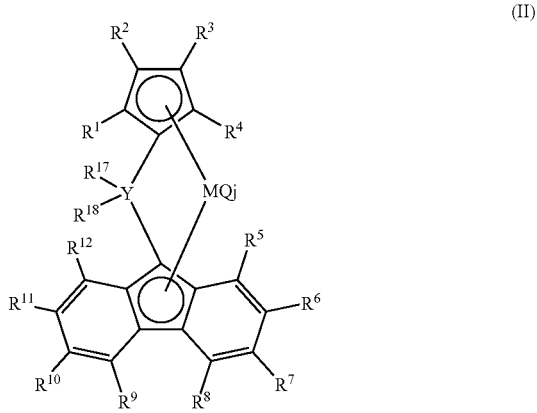

(II)

In the formula (II), $R^1$, $R^2$, $R^3$ and $R^4$ each are selected from hydrogen and a hydrocarbon group (f1), preferably a hydrocarbon group of 1 to 20 carbon atoms (f1'), and a silicon atom-containing group (f2), more preferably a silicon atom-containing group (f2') of 1 to 20 carbon atoms.

The hydrocarbon group (f1) is alkyl, alkenyl, alkynyl or aryl groups, which each contains only carbon and hydrogen. The hydrocarbon groups (f1) may include groups having alicyclic groups or an aromatic ring, which are obtainable by replacing any two adjacent hydrogen atoms simultaneously, and groups in which a part of hydrogen directly bonded to these carbon atoms is substituted with a hetero atom-containing hydrocarbon group replaced with a halogen atom, an oxygen-containing group, a nitrogen-containing group or a silicon atom-containing group. Examples of the hydrocarbon groups (f1') of 1 to 20 carbon atoms are linear chain hydrocarbon groups such as methyl, ethyl, n-propyl, allyl, n-butyl, n-pentyl, n-hexyl, n-heptyl, n-octyl, n-nonyl, or n-decanyl; branched hydrocarbon groups such as isopropyl, t-butyl, amyl, 3-methylpentyl, 1,1-diethylpropyl, 1,1-dimethylbutyl, 1-methyl-1-propylbutyl, 1,1-dipropylbutyl, 1,1-dimethyl-2-methylpropyl and 1-methyl-1-isopropyl-2-methylpropyl; cyclic saturated hydrocarbon groups such as cyclopentyl, cyclohexyl, cycloheptyl, cyclooctyl, norbonyl and adamantyl; cyclic unsaturated hydrocarbon groups such as phenyl, naphthyl, biphenyl, phenanthryl and antracenyl, and their nuclear alkyl substituted groups; saturated hydrocarbon groups substituted with an aryl group such as benzyl or cumyl; hetero atom-containing hydrocarbon groups such as methoxy, ethoxy, phenoxy, N-methylamino, trifluoromethyl, tribromomethyl, pentafluoroethyl and pentafluorophenyl.

The silicon atom-containing groups (f2) are, for example, groups in which cyclic carbon atoms in a cyclopentadienyl group bond to silicon atoms covalently and directly, and specific examples of those are alkylsilyl group and arylsilyl group. Examples of the silicon atom-containing groups (f2') having 1 to 20 carbon atoms include trimethylsilyl group and triphenylsilyl group.

From the viewpoint of producing the syndiotactic propylene polymer having a high stereoregularity (syndiotacticity) and a high melting point by solution polymerization in accordance with the production process of the present invention, the bridged metallocene compound represented by the formula (I) is preferably a metallocene compound having Cs symmetry. That is to say, it is preferable that $R^1$ and $R^4$ are the same atoms or the same groups, and $R^2$ and $R^3$ are the same atoms or the same groups, or are bonded to form a ring. It is more preferable that $R^1$ and $R^4$ are hydrogen atoms. It is particularly preferable that all of $R^1$, $R^2$, $R^3$ and $R^4$ are hydrogen atoms. Moreover, $R^5$ and $R^{12}$ are the same atoms or the same groups, $R^6$ and $R^{11}$ are the same atoms or the same groups, $R^7$ and $R^{10}$ are the same atoms or the same groups, and $R^8$ and $R^9$ are the same atoms or the same groups.

$R^5$, $R^8$, $R^9$ and $R^{12}$ are each selected from hydrogen, the hydrocarbon groups (f1), preferably the hydrocarbon groups having 1 to 20 carbon atoms (f1'), and the silicon atom-containing groups (f2), preferably the silicon atom-containing groups having 1 to 20 carbon atoms (f2'), and they may be the same or different from each other, and the adjacent groups may be bonded each other to form a ring. $R^6$ and $R^7$ are the same atoms or groups selected from hydrogen, hydrocarbon groups and silicon atom-containing groups, and may be bonded each other to form a ring. $R^{10}$ and $R^{11}$ are the same atoms or groups selected from hydrogen, hydrocarbon groups, and silicon atom-containing groups, and they may be bonded each other to form a ring, provided that $R^6$, $R^7$, $R^{10}$ and $R^{11}$ are not hydrogen atoms simultaneously. $R^{17}$ and $R^{18}$ are the same atoms or groups selected from hydrocarbon groups and silicon atom-containing groups, and may be bonded each other to form a ring.

From the viewpoint of synthesizing the syndiotactic polypropylene having a high stereoregularity (syndiotacticity) and a high melting point by solution polymerization in accordance with the production process of the present invention, it is preferable that both $R^7$ and $R^{10}$ are not hydrogen atoms, and more preferable that all of $R^6$, $R^7$, $R^{10}$ and $R^{11}$ are not hydrogen atoms. Particularly, in the case that $R^6$ and $R^{11}$ are hydrocarbon groups and the adjacent groups do not form a ring, it is preferable that $R^6$ and $R^{11}$ are each independently a hydrocarbon group having at least two carbon atoms, more preferably three or more carbon atoms, particularly preferably four or more carbon atoms, or a silicon atom-containing group. It is preferable that $R^7$ and $R^{12}$ are each a hydrocarbon group having at least two carbon atoms, more preferably three or more carbon atoms, particularly preferably four or more carbon atoms. Especially, $R^7$ and $R^{12}$ are each a sterically bulky alkyl group or aralkyl group having 4 to 20 carbon atoms.

When all of $R^6$, $R^7$, $R^{10}$ and $R^{11}$ are not hydrogen atoms, $R^6$ and $R^{11}$ are each preferably an aryl group or substituted aryl group.

$R^{17}$ and $R^{18}$ are each selected from the hydrocarbon groups (f1), preferably the hydrocarbon groups (f1') having 1 to 20 carbon atoms, or the silicon atom-containing groups (f2), preferably the silicon atom-containing groups (f2') having 1 to 20 carbon atoms, and may be the same or different from each other, and the substituents may be bonded to form a ring.

M is a titanium atom, zirconium atom or hafnium atom, Y is a carbon atom or silicon atom, Q's are identically or differently selected from a halogen, hydrocarbon group, anion ligand and neutral ligand capable of coordinating with a lone electron pair, and j is an integer of 1 to 4.

Specific examples of the halogen are fluorine atom, chlorine atom, bromine atom and iodine atom. Examples of the hydrocarbon group are methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, t-butyl, 1,1-dimethylbutyl, 1,1,3-trimethylbutyl, neopentyl, cyclohexylmethyl, cyclohexyl and 1-methyl-1-cyclohexyl. Specific examples of neutral, conjugated or non-conjugated dienes having not more than 10 carbon atoms are s-cis or s-trans-$\eta^4$-1,3-butadiene, s-cis or s-trans-$\eta^4$-1,4-diphenyl-1,3-butadiene, s-cis or s-trans-$\eta^4$-3-methyl-1,3-pentadiene, s-cis or s-trans-$\eta^4$-1,4-dibenzyl-1,3-butadiene, s-cis or s-trans-$\eta^4$-2,4-hexadiene, s-cis or s-trans-$\eta^4$-1,3-pentadiene, s-cis or s-trans-$\eta^4$-1,4-ditolyl-1,3-butadiene and s-cis or s-trans-$\eta^4$-1,4-bis(trimethylsilyl)-1,3-butadiene. Specific examples of the anion ligand are alkoxy groups such as methoxy, t-butoxy and phenoxy; carboxylate groups such as acetate and benzoate; and sulfonates such as mesylate and tosylate. Specific examples of the neutral ligand capable of coordinating with a lone electron pair are organic phosphoric compounds such as trimethyl phosphine, triethyl phosphine, triphenyl phosphine and diphenyl methyl phosphine; and ethers such as tetrahydrofurane, diethylether, dioxane and 1,2-dimethoxy ethane.

The compounds as defined above are catalysts generally having a Cs symmetric structure.

Specific examples of the component (A) satisfying the above definition will be shown below, but the scope of the present invention is not limited by the examples.

The examples of the component (A) include: cyclopropylidene(cyclopentadienyl)(3,6-di-t-butylfluorenyl)zirconium dichloride, cyclobutylidene(cyclopentadienyl)(3,6-di-tert-butylfluorenyl)zirconium dichloride, cyclopentylidene(cyclopentadienyl)(3,6-di-tert-butylfluorenyl)zirconium dichloride, cyclohexylidene(cyclopentadienyl)(3,6-di-tert-butylfluorenyl)zirconium dichloride, cycloheptylidene(cyclopentadienyl)(3,6-di-tert-butylfluorenyl)zirconium dichloride, dibenzylmethylene(cyclopentadienyl)(3,6-di-tert-butylfluorenyl)zirconium dichloride, dibenzylmethylene(cyclopentadienyl)(octamethyloctahydrodibenzofluorenyl) zirconium dichloride, di-n-butylmethylene(cyclopentadienyl)(2,7-dimethyl-3,6-di-tert-butylfluorenyl) zirconium dichloride, di-n-butylmethylene(cyclopentadienyl)(2,7-di(2,4,6-trimethylphenyl)-3,6-di-tert-butyl fluorenyl)zirconium dichloride, di-n-butylmethylene(cyclopentadienyl)(2,7-diphenyl-3,6-di-tert-butylfluorenyl)zirconium dichloride, di-n-butylmethylene(cyclopentadienyl)(2,7-di(3,5-dimethylphenyl)-3,6-di-tert-butylfluorenyl)zirconium dichloride, di-n-butylmethylene(cyclopentadienyl)(2,3,6,7-tetra-tert-butylfluorenyl) zirconium dichloride, di-n-butylmethylene(cyclopentadienyl)(2,7-di(4-methylphenyl)-3,6-di-tert-butylfluorenyl)zirconium dichloride, di-n-butylmethylene(cyclopentadienyl)(2,7-dinaphtyl-3,6-di-tert-butylfluorenyl) zirconium dichloride, di-n-butylmethylene(cyclopentadienyl)(2,7-di(4-tert-butylphenyl)3,6-di-tert-butylfluorenyl)zirconium dichloride, diisobutylmethylene(cyclopentadienyl)(2,7-dimethyl-3,6-di-tert-butylfluorenyl) zirconium dichloride, diisobutylmethylene(cyclopentadienyl)(2,7-di(2,4,6-trimethylphenyl)-3,6-di-tert-butylfluorenyl)zirconium dichloride, diisobutylmethylene(cyclopentadienyl)(2,7-diphenyl-3,6-di-tert-butylfluorenyl)zirconium dichloride, diisobutylmethylene(cyclopentadienyl)(2,7-di(3,5-dimethylphenyl)-3,6-di-tert-butylfluorenyl)zirconium dichloride, diisobutylmethylene(cyclopentadienyl)(2,3,6,7-tetra-tert-butylfluorenyl)zirconium dichloride, diisobutylmethylene(cyclopentadienyl)(2,7-di(4-methylphenyl)-3,6-di-tert-butylfluorenyl)zirconium dichloride, diisobutylmethylene(cyclopentadienyl)(2,7-dinaphthyl-3,6-di-tert-butylfluorenyl)zirconium dichloride, diisobutylmethylene(cyclopentadienyl)(2,7-di(4-tert-butylfluorenyl)-3,6-di-tert-butylfluorenyl)zirconium dichloride, dibenzylmethylene(cyclopentadienyl)(2,7-dimethyl-3,6-di-tert-butylfluorenyl) zirconium dichloride [sometimes referred to as 1,3-diphenylisopropylidene(cyclopentadienyl)(2,7-dimethyl-3,6-di-tert-butylfluorenyl)zirconium dichloride, hereinafter, the second name will be omitted.], dibenzylmethylene(cyclopentadienyl)(2,7-di(2,4,6-trimethylphenyl)-3,6-di-tert-butylfluorenyl)zirconium dichloride, dibenzylmethylene(cyclopentadienyl)(2,7-diphenyl-3,6-di-tert-butylfluorenyl) zirconium dichloride, dibenzylmethylene(cyclopentadienyl)(2,7-di(3,5-dimethylphenyl)-3,6-di-tert-butylfluorenyl) zirconium dichloride, dibenzylmethylene(cyclopentadienyl)(2,3,6,7-tetra-tert-butylfluorenyl)zirconium dichloride, dibenzylmethylene(cyclopentadienyl)(2,7-di(4-methylphenyl)-3,6-di-tert-butylfluorenyl)zirconium dichloride, dibenzylmethylene(cyclopentadienyl)(2,7-dinaphthyl-3,6-di-tert-butylfluorenyl)zirconium dichloride, dibenzylmethylene (cyclopentadienyl)(2,7-di(4-tert-butylphenyl)-3,6-di-tert-butylfluorenyl)zirconium dichloride, diphenethylmethylene (cyclopentadienyl)(2,7-dimethyl-3,6-di-tert-butylfluorenyl) zirconium dichloride, diphenethylmethylene (cyclopentadienyl)(2,7-diphenyl-3,6-di-tert-butylfluorenyl) zirconium dichloride, di(benzhydryl)methylene (cyclopentadienyl)(2,7-dimethyl-3,6-di-tert-butylfluorenyl) zirconium dichloride, di(benzhydryl)methylene (cyclopentadienyl)(2,7-diphenyl-3,6-di-tert-butylfluorenyl) zirconium dichloride, di(cumyl)methylene (cyclopentadienyl)(2,7-dimethyl-3,6-di-tert-butylfluorenyl) zirconium dichloride, di(cumyl)methylene (cyclopentadienyl)(2,7-diphenyl-3,6-di-tert-butylfluorenyl) zirconium dichloride, di(1-phenethyl)methylene (cyclopentadienyl)(2,7-dimethyl-3,6-di-tert-butylfluorenyl) zirconium dichloride, di(1-phenyl-ethyl)methylene (cyclopentadienyl)(2,7-diphenyl-3,6-di-tert-butylfluorenyl) zirconium dichloride, di(cyclohexylmethyl)methylene (cyclopentadienyl)(2,7-dimethyl-3,6-di-tert-butylfluorenyl) zirconium dichloride, di(cyclohexylmethyl)methylene (cyclopentadienyl)(2,7-diphenyl-3,6-di-tert-butylfluorenyl) zirconium dichloride, di(cyclopentylmethyl)methylene (cyclopentadienyl)(2,7-dimethyl-3,6-di-tert-butylfluorenyl) zirconium dichloride, di(cyclopentylmethyl)methylene (cyclopentadienyl)(2,7-diphenyl-3,6-di-tert-butylfluorenyl) zirconium dichloride, di(naphthylmethyl)methylene (cyclopentadienyl)(2,7-dimethyl-3,6-di-tert-butylfluorenyl) zirconium dichloride, di(naphthylmethyl)methylene (cyclopentadienyl)(2,7-diphenyl-3,6-di-tert-butylfluorenyl) zirconium dichloride, di(biphenylmethyl)methylene (cyclopentadienyl)(2,7-dimethyl-3,6-di-tert-butylfluorenyl) zirconium dichloride, di(biphenylmethyl)methylene (cyclopentadienyl)(2,7-diphenyl-3,6-di-tert-butylfluorenyl) zirconium dichloride, (benzyl)(n-butyl)methylene (cyclopentadienyl)(2,7-dimethyl-3,6-di-tert-butylfluorenyl) zirconium dichloride, (benzyl)(n-butyl)methylene (cyclopentadienyl)(2,7-diphenyl-3,6-di-tert-butylfluorenyl) zirconium dichloride, (benzyl)(cumyl)methylene (cyclopentadienyl)(2,7-dimethyl-3,6-di-tert-butylfluorenyl) zirconium dichloride, (benzyl)(cumyl)methylene (cyclopentadienyl)(2,7-diphenyl-3,6-di-tert-butylfluorenyl) zirconium dichloride, cyclopropylidene(cyclopentadienyl) (2,7-dimethyl-3,6-di-tert-butylfluorenyl)zirconium dichloride, cyclopropylidene(cyclopentadienyl)(2,7-diphenyl-3,6-di-tert-butylfluorenyl)zirconium dichloride, cyclobutylidene(cyclopentadienyl)(2,7-dimethyl-3,6-di-tert-butylfluorenyl)zirconium dichloride, cyclobutylidene(cyclopentadienyl)(2,7-diphenyl-3,6-di-tert-butylfluorenyl)zirconium dichloride, cyclopentylidene(cyclopentadienyl)(2,7-dimethyl-3,6-di-tert-butylfluorenyl)zirconium dichloride, cyclopentylidene(cyclopentadienyl)(2,7-diphenyl-3,6-di-tert-butylfluorenyl)zirconium dichloride, cyclohexylidene (cyclopentadienyl)(2,7-dimethyl-3,6-di-tert-butylfluorenyl) zirconium dichloride, cyclohexylidene(cyclopentadienyl)(2,7-diphenyl-3,6-di-tert-butylfluorenyl)zirconium dichloride, cycloheptylidene(cyclopentadienyl)(2,7-dimethyl-3,6-di-tert-butylfluorenyl)zirconium dichloride, cycloheptylidene (cyclopentadienyl)(2,7-diphenyl-3,6-di-tert-butylfluorenyl) zirconium dichloride, dibenzylmethylene(cyclopentadienyl) (2,7-dimethyl-3,6-dimethyl-butylfluorenyl)zirconium dichloride, di-n-butylmethylene(cyclopentadienyl)(2,7-dimethyl-3,6-dimethyl-butylfluorenyl)zirconium dichloride, dibenzylmethylene(cyclopentadienyl)(2,7-dimethyl-3,6-dicumyl-butylfluorenyl)zirconium dichloride, di-n-butylmethylene(cyclopentadienyl)(2,7-dimethyl-3,6-dicumyl-butylfluorenyl)zirconium dichloride, dibenzylmethylene (cyclopentadienyl)(2,7-dimethyl-3,6-di(trimethylsilyl)-butylfluorenyl)zirconium dichloride, di-n-butylmethylene (cyclopentadienyl)(2,7-dimethyl-3,6-di(trimethylsilyl)-butylfluorenyl)zirconium dichloride, dibenzylmethylene (cyclopentadienyl)(2,7-dimethyl-3,6-diphenyl-butylfluorenyl)zirconium dichloride, di-n-butylmethylene (cyclopentadienyl)(2,7-dimethyl-3,6-diphenyl-butylfluorenyl)zirconium dichloride, dibenzylmethylene (cyclopentadienyl)(2,7-dimethyl-3,6-dibenzyl-butylfluorenyl)zirconium dichloride, di-n-butylmethylene (cyclopentadienyl)(2,7-dimethyl-3,6-dibenzyl-butylfluorenyl)zirconium dichloride, dibenzylmethylene (cyclopentadienyl)(2,7-dimethyl-3,6-dimethyl-butylfluorenyl)zirconium dichloride, di-n-butylmethylene (cyclopentadienyl)(2,7-dimethyl-3,6-dimethyl-butylfluorenyl)zirconium dichloride, diphenylmethylene (cyclopentadienyl)(2,7-dimethyl-3,6-di-tert-butylfluorenyl) zirconium dichloride, diphenylmethylene(cyclopentadienyl) (2,7-diphenyl-3,6-di-tert-butylfluorenyl)zirconium dichloride, di(p-tolyl)methylene(cyclopentadienyl)(2,7-dimethyl-3,6 di-tert-butylfluorenyl)zirconium dichloride, di(p-tolyl)methylene(cyclopentadienyl)(2,7-diphenyl-3,6-di-tert-butylfluorenyl)zirconium dichloride, di(p-chlorophenyl) methylene(cyclopentadienyl)(2,7-dimethyl-3,6-di-tert-butylfluorenyl)zirconium dichloride, di(p-chlorophenyl) methylene(cyclopentadienyl)(2,7-diphenyl-3,6-di-tert-butylfluorenyl)zirconium dichloride, di(m-chlorophenyl) methylene(cyclopentadienyl)(2,7-dimethyl-3,6-di-tert-butylfluorenyl)zirconium dichloride, di(m-chlorophenyl) methylene(cyclopentadienyl)(2,7-diphenyl-3,6-di-tert-butylfluorenyl)zirconium dichloride, di(p-bromophenyl) methylene(cyclopentadienyl)(2,7-dimethyl-3,6-di-tert-butylfluorenyl)zirconium dichloride, di(p-bromophenyl) methylene(cyclopentadienyl)(2,7-diphenyl-3,6-di-tert-butylfluorenyl)zirconium dichloride, di(m-trifluoromethyl-phenyl)methylene (cyclopentadienyl)(2,7-dimethyl-3,6-di-tert-butylfluorenyl)zirconium dichloride, di(m-trifluoromethyl-phenyl)methylene (cyclopentadienyl)(2,7-diphenyl-3,6-di-tert-butylfluorenyl)zirconium dichloride, di(p-trifluoromethyl-phenyl)methylene (cyclopentadienyl) (2,7-dimethyl-3,6-di-tert-butylfluorenyl)zirconium dichloride, di(p-trifluoromethyl-phenyl)methylene (cyclopentadienyl)(2,7-diphenyl-3,6-di-tert-butylfluorenyl)zirconium dichloride, di(p-tert-butyl-phenyl)methylene (cyclopentadienyl)(2,7-dimethyl-3,6-di-tert-butylfluorenyl)zirconium dichloride, di(p-tert-butyl-phenyl)methylene (cyclopentadienyl)(2,7-diphenyl-3,6-di-tert-butylfluorenyl)zirconium dichloride, di(p-n-butyl-phenyl)methylene (cyclopentadienyl)(2,7-dimethyl-3,6-di-tert-butylfluorenyl)zirconium dichloride, di(p-n-butyl-phenyl)methylene (cyclopentadienyl)(2,7-diphenyl-3,6-di-tert-butylfluorenyl)zirconium dichloride, di(p-biphenyl)methylene(cyclopentadienyl)(2,7-dimethyl-3,6-di-tert-butylfluorenyl)zirconium dichloride, di(p-biphenyl)methylene(cyclopentadienyl)(2,7-diphenyl-3, 6-di-tert-butylfluorenyl)zirconium dichloride, di(1-naphthyl) methylene(cyclopentadienyl)(2,7-dimethyl-3,6-di-tert-butylfluorenyl)zirconium dichloride, di(1-naphthyl)methylene (cyclopentadienyl)(2,7-diphenyl-3,6-di-tert-butylfluorenyl) zirconium dichloride, di(2-naphthyl)methylene (cyclopentadienyl)(2,7-dimethyl-3,6-di-tert-butylfluorenyl) zirconium dichloride, di(2-naphthyl)methylene (cyclopentadienyl)(2,7-diphenyl-3,6-di-tert-butylfluorenyl) zirconium dichloride, di(naphthylmethyl)methylene (cyclopentadienyl)(2,7-dimethyl-3,6-di-tert-butylfluorenyl) zirconium dichloride, di(naphthylmethyl)methylene (cyclopentadienyl)(2,7-diphenyl-3,6-di-tert-butylfluorenyl) zirconium dichloride, di(p-isopropylphenyl)methylene (cyclopentadienyl)(2,7-dimethyl-3,6-di-tert-butylfluorenyl) zirconium dichloride, di(p-isopropylphenyl)methylene (cyclopentadienyl)(2,7-diphenyl-3,6-di-tert-butylfluorenyl) zirconium dichloride, di(biphenylmethyl)methylene (cyclopentadienyl)(2,7-dimethyl-3,6-di-tert-butylfluorenyl) zirconium dichloride, di(biphenylmethyl)methylene (cyclopentadienyl)(2,7-diphenyl-3,6-di-tert-butylfluorenyl) zirconium dichloride, diphenylsilylene(cyclopentadienyl)(2, 7-dimethyl-3,6-di-tert-butylfluorenyl)zirconium dichloride, and diphenylsilylene(cyclopentadienyl)(2,7-diphenyl-3,6-di-tert-butylfluorenyl)zirconium dichloride.

Among the above compounds, it is preferred to use the compounds in which $R^6$ and $R^{11}$ are each an aryl group such as phenyl group, tolyl group, t-butylphenyl group, dimethylphenyl group', trimethylphenyl group and biphenyl group, or a substituted aryl group because of giving a syndiotactic propylene polymer having a high melting point. In the examples of the present invention, which is to be described later, a compound used was dibenzylmethylene(cyclopentadienyl)(2,7-diphenyl-3,6-di-tert-butylfluorenyl)zirconium dichloride represented by the following formula (III) in which both of $R^6$ and $R^{11}$ at the 2 position and at the 7 position in the fluorenyl group are phenyl groups, both of $R^7$ and $R^{10}$ at the 3 position and at the 6 position in the fluorenyl group are t-butyl groups, and both of $R^{17}$ and $R^{18}$ present in carbon atoms in the bridged part are benzyl groups.

[Chem. 4]

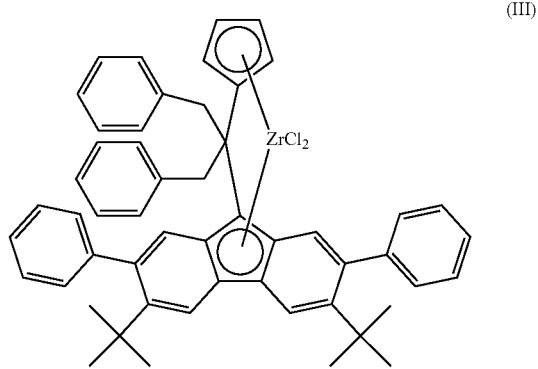

(III)

Examples of the component (A), further, may include compounds obtainable by replacing "zirconium" with "hafnium" or "titanium" in the above compounds, and bridged metallocene compounds obtainable by replacing "dichloride" with "difluoride", and bridged metallocene compounds obtainable by replacing "dibromide", "di-iodide" or "dichloride" with "dimethyl" or "methylethyl".

The above bridged metallocene compounds (A) can be produced by a known method. The production method thereof is not particularly limited. Examples of the known production method are a production method disclosed in WO2001/27124 and a method disclosed in WO2004/087775 both filed by the present applicant. These metallocene compounds may be used singly or two or more may be optionally combined for use.

The polymerization catalyst of the present invention comprises (A) the metallocene compound, and (B) at least one compound selected from (b-1) the organoaluminum oxy compound, (b-2) the compound capable of forming an ion pair by reaction with the metallocene compound (A), and (b-3) the organoaluminum compound. Furthermore, it is possible to optionally use a support type catalyst in which the component (A) and/or the component (B) are supported on (C) a particulate carrier, as the polymerization catalyst of the present invention. Moreover, (D) the organic compound component to be described later may be optionally used simultaneously.

(B) Component
(b-1) Organoaluminum Oxy Compound

As (b-1) the organoaluminum oxy compound of the present invention (sometimes referred to as "component (b-1)" in the following description), conventionally known aluminoxane may be used as it is.

Examples thereof may include aluminoxane represented by the following formula (IV):

[Chem. 5]

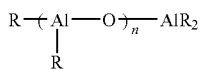

(IV)

in the formula (IV), R's are each independently a hydrocarbon group of 1 to 10 carbon atom(s), and n is an integer of 2 or more, and/or may include aluminoxane represented by the following formula (V):

[Chem. 6]

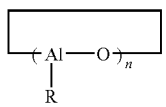

(V)

in the formula (V), R is a hydrocarbon group of 1 to 10 carbon atom(s), and n is an integer of 2 or more. Particularly, it is desired to use aluminoxane in which R is a methyl group, namely methylaluminoxane, and n is 3 or more, preferably at least 10. These aluminoxanes may include some organoaluminum compounds. Moreover, it is possible to suitably use organoaluminum oxy compounds as disclosed in JP-A-H2 (1990)-167305, and aluminoxanes having at least two kinds of alkyl groups as disclosed in JP-A-H2 (1990)-24701 and JP-A-H3 (1991)-103407.

Furthermore, modified methyl aluminoxanes represented by the following formula (VI) can be exemplified as the organoaluminum oxy compound of the present invention.

[Chem. 7]

(VI)

in the formula (VI), R is a hydrocarbon group of 1 to 10 carbon atom(s), and m and n are each an integer of 2 or more.

The modified methyl aluminoxanes are prepared using trimethylaluminum and alkyl aluminums except for trimethyl aluminum. Such modified methyl aluminoxanes (VI) are occasionally referred to as MMAOs. MMAOs may be prepared by, for example, a method as described in U.S. Pat. No. 4,960,878 or commercially available ones can be used as they are. For example, MMAOs of the formula (VI) in which R is an isobutyl group, prepared by using trimethyl aluminum and triisobutyl aluminum, are commercially produced by Tohso Fine Chem Co., Ltd. in the trade names of MMAO or TMAO. MMAO is an aluminoxane having improved solubility to various solvents and storage stability. Specifically, MMAO has a property that it is soluble in aliphatic hydrocarbons and alicyclic hydrocarbons different to aluminoxanes insoluble or slightly soluble in benzene, such as the compounds represented by the formulas (IV) and (V). Therefore, when there is a demand that a solvent having a high load to the environment, such as benzene or the like is not used, the above modified methyl aluminoxane is preferably used.

(b-2) Compound Capable of Forming an Ion Pair by Reacting with the Bridged Metallocene Compound (A)

Examples of the compound (b-2) capable of forming an ion pair by reacting with the bridged metallocene compound (A) (hereinafter sometimes referred to as "ionizing ionic compound" or "component (b-2)") may include Lewis acid, an ionizing ionic compound, a borane compound and a carborane compound, as described in JP-A-H1 (1989)-501950 and the like. Examples thereof, further, may include a heteropoly compound and an isopoly compound. The ionizing ionic compound preferably used in the present invention is a compound represented by the formula (VII).

[Chem. 8]

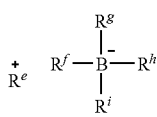

(VII)

In the formula (VII), examples of $R^{+e}$ are $H^+$, carbenium cation, oxonium cation, ammonium cation, phosphonium cation, cyclohepthyl trienyl cation and ferrocenium cation having a transition metal. $R^f$, $R^g$, $R^h$ and $R^j$ may be the same or different from each other and are each an organic group, preferably an aryl group.

(b-3) Organoaluminum Compound

Examples of the organoaluminum compound (b-3) for constituting the olefin polymerization catalyst (hereinafter, sometimes abbreviated to "component (b-3)" may include organoaluminum compounds represented by the following formula (VIII).

(VIII)

In the formula, $R^a$ and $R^b$ may be the same or different from each other and are each a hydrocarbon group having 1 to 15 carbon atoms, preferably 1 to 4 carbon atoms, X is a halogen atom, $0<m\leq 3$, $0\leq n<3$, $0\leq p<3$, $0\leq q<3$ and $m+n+p+q=3$.

Specific examples of the component (b-3) are linear chain trialkyl aluminums such as trimethyl aluminum, triethyl aluminum, tri-n-butyl aluminum, trihexyl aluminum and trioctyl aluminum; branched trialkyl aluminums such as triisopropyl aluminum, triisobutyl aluminum, tri-sec-butyl aluminum, tri-tert-butyl aluminum, tri-2-methylbutyl aluminum, tri-3-methylhexyl aluminum and tri-2-ethylhexyl aluminum; tricycloalkyl aluminums such as tricyclohexyl aluminum and tricyclooctyl aluminum; triaryl aluminums such as triphenyl aluminum and tritolyl aluminum; dialkylaluminum hydrides such as diisopropyl aluminum hydride and diisobutyl aluminum hydride; alkenyl aluminums such as isoprenyl aluminums represented by the formula $(i\text{-}C_4H_9)_xAl_y(C_5H_{10})_z$ (wherein x, y and z are each a positive number and $z\leq 2x$) and the like; alkyl aluminum alkoxides such as isobutyl aluminum methoxide and isobutyl aluminum ethoxide; dialkyl aluminum alkoxides such as dimethyl aluminum methoxide, diethyl aluminum ethoxide and dibutyl aluminum butoxide; alkyl aluminum sesqui-alkoxides such as ethyl aluminum sesquiethoxide and butyl aluminum sesquibutoxide; partially alkoxylated alkyl aluminums having an average composition represented by the formula $R^a{}_{2.5}Al(OR^b)_{0.5}$ and the like;

alkyl aluminum aryloxides such as diethyl aluminum phenoxide and diethyl aluminum (2,6-di-t-butyl-4-methyl phenoxide); dialkyl aluminum halides such as dimethyl aluminum chloride, diethyl aluminum chloride, dibutyl aluminum chloride, diethyl aluminum bromide and diisobutyl aluminum chloride; alkyl aluminum sesquihalides such as ethyl aluminum sesquichloride, butyl aluminum sesquichloride and ethyl aluminum sesquibromide; partially halogenated alkyl aluminums of alkyl aluminum dihalides, such as ethyl aluminum dichloride, or the like; dialkyl aluminum hydrides such as diethyl aluminum hydride, and dibutyl aluminum hydride; partially hydrogenated alkyl aluminums of alkyl aluminum dihydrides, such as ethyl aluminum dihydride and propyl aluminum dihydride, or the like; and partially alkoxylated and halogenated alkyl aluminums such as ethyl aluminum ethoxy chloride, butyl aluminum butoxy chloride and ethyl aluminum ethoxy bromide.

From the viewpoint of availability, it is preferred to use any one of trimethyl aluminum, triethyl aluminum and triisobutyl aluminum as the organoaluminum compound (b-3).

In the present invention, from the viewpoint of improving the polymerization activity and the properties of the obtainable syndiotactic propylene polymer, it is preferred to use any one of the following [c1] to [c4] as the component (B);

[c1] the component (B) comprising only (b-1) the organoaluminum oxy compound,

[c2] the component (B) comprising (b-1) the organoaluminum oxy compound, and (b-3) the organoaluminum compound,

[c3] the component (B) comprising (b-2) the compound forming an ion pair by reacting with the bridged metallocene compound (A), and (b-3) the organoaluminum compound, and

[c4] the component (B) comprising (b-1) the organoaluminum oxy compound, and (b-2) the compound forming an ion pair by reacting with the bridged metallocene compound (A).

When the metallocene compound of the formula (I) in which Y is a silicon atom is used, (b-2) the compound forming an ion pair by reacting with the bridged metallocene compound (A) is not used as the component (B) for constituting the olefin polymerization catalyst of the present invention, as described above. Therefore, among [c1] to [c4], [c1] and [c2] only are employed for the preferred components (B).

The olefin polymerization catalyst of the present invention may further comprise the carrier (C) together with (A) the metallocene compound represented by the formula (I), and (B) at least one compound selected from (b-1) the organoaluminum oxy compound, (b-2) the compound capable of forming an ion pair by reaction with the metallocene compound (A), and (b-3) the organoaluminum compound, if necessary.

(C) Carrier

The carrier (C) optionally used in the present invention (hereinafter sometimes abbreviated to "component (C)") is an inorganic or organic compound, and a granular or fine particulate solid. Examples of the inorganic compound are porous oxides such as $SiO_2$ and $Al_2O_3$; inorganic halides such as $MgCl_2$, $MgBr_2$, $MnCl_2$ and $MnBr_2$; clays, clay minerals or ion exchange layer compounds such as montmorillonite, Vermiculite, pectolite, tenolite and synthetic mica.

Examples of the organic compounds are granular or fine particulate organic solids having a particle diameter of from 3 to 300 μm, preferably 10 to 300 μm. Specific examples thereof may include (co) polymers, which essentially comprise an α-olefin of 2 to 14 carbon atoms such as ethylene, propylene, 1-butene and 4-methyl-1-pentene, (co)polymers, which essentially comprise vinyl cyclohexane or styrene; and polymers having a polar functional group obtainable by copolymerizing or graft polymerizing these polymers with a polar monomer such as acrylic acid, acrylic acid ester or maleic anhydride, or modified polymers thereof.

The polymerization catalyst of the present invention may contain an organic compound component (D) (hereinafter sometimes abbreviated to "component (D)"), if necessary. The component (D) is used in order to control the polymerization capability and the physical properties of the obtainable polymer. Examples of the component (D) are alcohols, phenol compounds, carboxylic acid, phosphorus compounds and sulfonic acid salts.

Next, the process for preparing the polymerization catalyst for producing the syndiotactic propylene polymers, which catalyst comprises the components (A) and (B), and optionally the component (C) and/or the component (D) is described. Further, the method for adding them to a polymerizer is also described.

When the polymerization catalyst comprises only the component (A) and the component (B), a process for adding the components (A) and (B) to a polymerizer simultaneously or in an arbitrary order is employed. In this process, at least two components of the catalyst components may be previously contacted.

In carrying out the solution polymerization of propylene singly or monomers, in which propylene is contained as essential component, by using the polymerization catalyst, the component (A) is used in an amount of from $10^{-9}$ to $10^{-1}$ mol, preferably $10^{-8}$ to $10^{-2}$ mol per 1 L of the reaction volume.

The component (b-1) is used in an amount such that the molar ratio [(b-1)/M] of component (b-1) to all transition metal atoms M in the component (A) is usually from 0.01 to 5,000, preferably 0.05 to 2,000. The component (b-2) is used in an amount such that the molar ratio [(b-2)]/M of aluminum atom in component (b-2) to all transition metal atoms M in the component (A) is usually from 1.0 to 5,000, preferably 1.0 to 2,000. The component (b-3) is used in an amount such that the molar ratio [(b-3)/M] of component (b-3) to all transition metal atoms M in the component (A) is usually from 1 to 10,000, preferably 1 to 5,000.

Inert Hydrocarbon Solvent and Amount of Solvent in Polymerization

Examples of the inert hydrocarbon solvent used in the production process of the present invention may include aliphatic hydrocarbons such as propane, butane, pentane, hexane, heptane, octane, decane, kerosene, hydrogenated naphtha and ISOPAR-E (Trade Mark) solvent (mixed solvent of $C_{8-12}$ aliphatic) available by Exxon Chemicals; alicyclic hydrocarbons such as cyclopentene, cyclohexane and methylcyclopentane; and aromatic hydrocarbons such as benzene, toluene and xylene. Among them, hydrocarbons having 5 to 12 carbon atoms are preferred. In the present invention, it is important that when the inert hydrocarbon solvent having at least one structure selected from a branched structure (k-1), a ring structure (k-2) and an aromatic ring structure (k-3) in the molecule is used as the inert hydrocarbon solvent, the equilibrium melting temperature ($T_M$) can be decreased, and as a result, homogenous continuous solution polymerization reaction can be carried out without high temperature conditions. The present inventors considered that this is because, in the solvent having at least one structure selected from the structures (k-1) to (k-3), the solubility parameter ($\delta_1$) of the solvent represented by the formula (Eq-1) to be described later approaches to the solubility parameter (15.6 MPa$^{1/2}$) of a syndiotactic propylene polymer described in Carl L. Yaws, "Chemical properties Handbook" Chapter 14, McGraw-Hill, 1999, and/or the molar volume (V1) of the solvent is small. The branched structure (k-1) is a structure having a ternary carbon atom or a quaternary carbon atom. The cyclic structure (k-2) is a cyclic polymethylene skeleton. The solvent preferably has three structures of the branched structure (k-1), the cyclic structure (k-2) and the linear chain structure. The linear chain structure is a structure such that at least three methylene skeletons link linearly (namely it is not a cyclic structure).

The three kinds of structures (k-1) to (k-3) may be present in the same molecule or plural molecules. From the viewpoint of availability, three kinds of hydrocarbons, namely the branched hydrocarbon (y-1) having a branched structure, the cyclic aliphatic hydrocarbon (y-2) having a cyclic structure and the aromatic hydrocarbon (y-3) are generally mixed with a linear chain hydrocarbon appropriately and then submitted to use. From the recent viewpoint of decrease of the load to the environment and the viewpoint of minimizing the influence on health of the human body for production workers, it is not preferable to use the aromatic hydrocarbon (y-3) having the aromatic cyclic structure (k-3). However, the use thereof does not limit the present invention as long as equipments taking sufficient measures for the environmental problems and the health problems for human body are used.

Preferable examples of the solvents are inert hydrocarbons containing at least 90% by volume of at least one hydrocarbon selected from cyclopentane, n-hexane, isohexane, methylcyclopentane, cyclohexane and n-heptane.

Although the amount of the inert hydrocarbon solvent used is limited by factors such as miscibility of the solvent with a monomer, the solvent generally is fed continuously in an amount such that the polymer content per polymerization solution unit volume in a polymerizer (hereinafter, simply abbreviated to "polymer content (PC)") is from 5 g/L to 500 g/L, preferably 10 g/L to 400 g/L, more preferably 15 g/L to 300 g/L, considering the range of the volume fraction ($V_2$). When the concentration is less than 5 g/L, the production speed capable of enduring practical production cannot be attained, while when it is over 500 g/L, it is possible that a part of the polymer is deposited during the polymerization to hinder the regular continuous-polymerization. Therefore, the concentration departing from the above range is not preferable.

The volume fraction ($v_2$) of non-dimensional unit of the polymer in the formula (Eq-1) or the formula (Eq-2) can be converted to the polymer content (PC) using the densities of the polymer and the solvent.

In the preferred embodiment of the solution polymerization step ($P_1$) according to the present invention, the inert hydrocarbon solvent, the solvent amount and the polymerization temperature ($T_R$), and the equilibrium melting temperature ($T_M$) derived from the following formula (Eq-2) satisfy the following formula (Eq-1), preferably the following formula (Eq-1'), more preferably the following formula (Eq-1"). That is to say, it is very important in the present invention that the inert hydrocarbon solvent and the solvent amount are determined in order that the polymerization temperature ($T_R$) determined by the method to be described later is, always higher than the temperature which is 45° C. lower than the equilibrium melting temperature ($T_M$).

[Formula 1]
$$T_M - T_R \leq 45° C. \qquad (Eq\text{-}1)$$

[Formula 2]
$$T_M - T_R \leq 43° C. \qquad (Eq\text{-}1')$$

[Formula 3]
$$T_M - T_R \leq 40° C. \qquad (Eq\text{-}1'')$$

[Formula 4]
$$T_M = \frac{6{,}700 + 49 \times (\delta_1 - 15.6)^2 \times (1 - v_2)^2}{\frac{49 \times R}{V_1} \times (1 - v_2) + \frac{6{,}700}{T_m}} \qquad (Eq\text{-}2)$$

$T_M$: Equilibrium melting temperature [K]
$T_m$: Melting point of syndiotactic propylene polymer [K]
$\delta 1$: Solubility parameter of solvent [(MPa)$^{1/2}$]
$V_1$: Molar volume of solvent [cm$^3$/mol]
$v_2$: Volume fraction of syndiotactic propylene polymer [-]
R: Gas constant [J/K·mol]

The formula (Eq-2) is derived by substituting the fusion enthalpy $\Delta H_u$ (6,700 J/mol) of syndiotactic polypropylene measured by the present applicant, the molar volume value $V_u$ (49 cm$^3$/mol) of a unit of the polypropylene represented by the following formula (IX) and the published solubility parameter $\delta_2$ (15.6 J/mol) of the polypropylene for the formula (Eq-3) derived from the Flory-Huggins theory about solution-solid equilibrium of polymer.

[Formula 5]
$$T_M = \frac{\Delta H_u + V_u \times (\delta_1 - \delta_2)^2 \times (1 - v_2)^2}{\frac{V_u \times R}{V_1} \times (1 - v_2) + \frac{\Delta H_u}{T_m}} \qquad (Eq\text{-}3)$$

[Chem. 9]

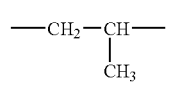

(IX)

In the table 1, supposing that the polymerization temperature is 50° C., and the polymer volume fraction ($v_2$) is 0.10 (the polymer concentration corresponds to 86 g/L) and 0.15

(the polymer concentration corresponds to 129 g/L), $T_M$ and the temperature difference ($T_M$-$T_R$) concerning typical hydrocarbon solvents were calculated. In the calculation, the molar volume ($V_1$) of the solvent and the solubility parameter ($\delta_1$) of the solvent were taken from the values described in Carl L. Yaws, "Chemical Properties Handbook", Chapter 14, McGraw-Hill, 1999. When the polymer volume fraction ($v_2$) is 0.10, solvents suitable to the formula (Eq-1) are fifteen kinds of solvents including spiropentane, cyclopentane, isopentane, n-pentane, benzene, cyclohexane, methylcyclopentane, n-hexane, 1,1-dimethylcyclopentane, cis-1,2-dimethylcyclopentane, trans-1,2-dimethylcyclopentane, cis-1,3-dimethylcyclopentane, trans-1,3-dimethylcyclopentane, ethylcyclopentane and methylcyclohexane. However, from the table 1, it is found that when the polymer concentration is increased and $v_2$ is 0.15, the suitable solvents are limited to the six kinds of solvents including spiropentane, cyclopentane, n-pentane, benzene, cyclohexane and methylcyclopentane. The scope of the claims of the present invention are not limited by the hydrocarbon compounds described in Table 1, which are shown as one example of the calculation method.

In the formula (Eq-4), $\Delta H_u$, $V_u$, $T_M$ and R are the same as those in the formula (Eq-3), $v_1$ and $v_2$ show volume fractions of the solvent 1 and the solvent 2 respectively, $V_1$ and $V_2$ show molar volume of the solvent 1 and solvent 2 respectively, and $\delta_1$, $\delta_2$ and $\delta_p$ are solubility parameters of the solvent 1, solvent 2 and syndiotactic polypropylene, respectively.

The equilibrium melting temperature $T_M$ of the mixed solvent used in the example or the comparative example to be described later is determined using the formula (Eq-4) and the partially expanded formula thereof.

In the particularly preferred embodiment of the solution polymerization step ($P_1$) according to the present invention, the volume fraction ($v_2$) of the syndiotactic propylene polymer in the formula (Eq-2) is from 0.005 to 0.50, preferably 0.01 to 0.40, more preferably 0.15 to 0.30. When the volume fraction ($v_2$) is less than 0.005, the production speed is low and thereby the production process is hardly carried out industrially. On the other hand, the volume fraction ($v_2$) over 0.50 decreases the range of selection of the available solvent, which satisfies the formula (Eq-1) of relations of the equilibrium melting temperature ($T_M$) determined from the formula

TABLE 1

| Typical names of hydrocarbon compounds | $v_2 = 0.1$ Polymer concentration = 86 g/L | | $v_2 = 0.15$ Polymer concentration = 129 g/L | |
|---|---|---|---|---|
| | $T_M[°C.]$ | $T_M - T_R[°C.]$ | $T_M[°C.]$ | $T_M - T_R[°C.]$ |
| spiropentane | 73.35 | 23.35 | 77.15 | 27.15 |
| cyclopentane | 74.97 | 24.97 | 78.65 | 28.65 |
| isopentane | 93.69 | 43.69 | 96.44 | 46.44 |
| n-pentane | 89.59 | 39.59 | 92.72 | 42.72 |
| benzene | 89.01 | 39.01 | 91.12 | 41.12 |
| cyclohexane | 85.25 | 35.25 | 88.56 | 38.56 |
| methylcyclopentane | 85.76 | 35.76 | 89.17 | 39.17 |
| 2,2-dimethylbutane | 102.18 | 52.18 | 104.55 | 54.55 |
| 2,3-dimethylbutane | 97.16 | 47.16 | 99.97 | 49.97 |
| n-hexane | 94.71 | 44.71 | 97.77 | 47.77 |
| 2-methylpentane | 97.62 | 47.62 | 100.43 | 50.43 |
| 3-methylpentane | 95.45 | 45.45 | 98.41 | 48.41 |
| toluene | 97.14 | 47.14 | 99.19 | 49.19 |
| cycloheptane | 95.17 | 45.17 | 97.92 | 47.92 |
| 1,1-dimethylcyclopentane | 93.78 | 43.78 | 96.92 | 46.92 |
| cis-1,2-dimethylcyclopentane | 93.07 | 43.07 | 96.20 | 46.20 |
| trans-1,2-dimethylcyclopentane | 94.03 | 44.03 | 97.16 | 47.16 |
| cis-1,3-dimethylcyclopentane | 94.49 | 44.49 | 97.61 | 47.61 |
| trans-1,3-dimethylcyclopentane | 94.26 | 44.26 | 97.38 | 47.38 |
| ethylcyclopentane | 93.97 | 43.97 | 97.04 | 47.04 |
| methylcyclohexane | 93.51 | 43.51 | 96.61 | 46.61 |
| 2,2-dimethylpentane | 104.95 | 54.95 | 107.38 | 57.38 |
| 2,3-dimethylpentane | 100.52 | 50.52 | 103.32 | 53.32 |
| 2,4-dimethylpentane | 104.44 | 54.44 | 106.94 | 56.94 |
| 3,3-dimethylpentane | 102.09 | 52.09 | 104.74 | 54.74 |
| 3-ethylpentane | 99.63 | 49.63 | 102.49 | 52.49 |
| n-heptane | 100.32 | 50.32 | 103.18 | 53.18 |
| 2-methylhexane | 101.57 | 51.57 | 104.34 | 54.34 |
| 3-methylhexane | 100.54 | 50.54 | 103.37 | 53.37 |
| 2,2,3-trimethylbutane | 103.62 | 53.62 | 106.12 | 56.12 |

When the solvent to be submitted to solution polymerization comprises at least two kinds of inert hydrocarbons, for example in the case of two hydrocarbons, it is possible to determine the equilibrium melting temperature ($T_M$) using the following formula (Eq-4).

[Formula 6]

$$T_M = \frac{\Delta H_u - V_u \left[ \frac{v_1 v_2 (\delta_1 - \delta_2)^2 - (v_1 + v_2)}{\{v_1(\delta_1 - \delta_p)^2 + v_2(\delta_2 - \delta_p)\}^2} \right]}{\frac{\Delta H_u}{T_m} + V_u R\left(\frac{v_1}{V_1} + \frac{v_2}{V_2}\right)} \quad \text{(Eq-4)}$$

(Eq-2) and the polymerization temperature ($T_R$). Therefore, the volume fraction ($v_2$) of over 0.50 is not preferred.

[1-2] Polymerization Process

The "solution polymerization" according to the present invention includes not only completely homogeneous solution polymerization such that polymerization is carried out at a specific temperature in a condition of polymers substantially dissolved in the inert hydrocarbon solvent completely but also partially heterogeneous solution polymerization such that polymerization is carried out in a white-turbidity state in which fine polymers are deposited partly. As the homogeneity of the solution, namely the transparency is higher, in the polymerization, it is easier to carry out solution polymerization of syndiotactic polypropylene according to the present invention and to carry out the continuous production by the solution polymerization, and moreover, the occurrence of operation trouble caused by deposited polymers can be decreased. Therefore, the homogenous condition is more preferred. The present invention is not limited to the solution polymerization in a complete homogeneous condition as long as polymers having aimed quality can be obtained.

Monomer(s) used in the solution polymerization step ($P_1$) of the present invention is propylene only or a mixed olefin comprising or propylene as an essential component. In the present invention, the meaning of "essential component" is defined by the fact that the propylene concentration in the mixed olefin is not less than 50 mol %, preferably not less than 70 mol %, more preferably not less than 80 mol %. It is possible to optionally use, as the other olefins other than propylene, olefins having 2 to 10 carbon atoms such as ethylene, 1-butene, 2-butene, 1-pentene, 3-methyl-1-butene, 1-hexene, 1-heptene, 1-octene, 1-decene, 3-methyl-1-pentene, 4-methyl-1-pentene. From the viewpoint of availability, ethylene, 1-butene, 1-hexene, 1-octene and 4-methyl-1-pentene are used. Furthermore, in the solution polymerization of the present invention, it is possible to use a known molecular weight modifier such as hydrogen molecule or the like.

In the process for producing the syndiotactic propylene polymer of the present invention, the characteristics in the process of the solution polymerization step ($P_1$) are the following two points.

1) The step is carried out by the solution polymerization
2) The polymerization is carried out at a temperature in the specific range.

Each of the characteristics is described in detail below.

The polymerization step ($P_1$) of the present invention is carried out in a solution condition, preferably continuously. That is to say, in the polymerization step ($P_1$), propylene singly or monomers in which propylene is contained as the essential component, the solvent and the polymerization catalyst are continuously fed each alone or mixed into a polymerizer with forced stirring capable of attaining complete mixing, to carry out polymerization, and then the polymer solution is taken out continuously, and transported to the post-treatment step ($P_2$) as described later. In the polymerization step ($P_1$), polymerization temperature is regulated by removing polymerization heat generated in such a way that vapor, in the polymerizer, of the monomers) and the solvent is passed a condenser to be condensed through a pipe whose opening is in the gas phase space of the polymerizer upper part, and the condensed solution is returned to the polymerizer, and thereby evaporation latent heat is removed.

In the continuous polymerization, the average retention time, which varies depending on conditions such as the shape of the polymerizer, the catalyst type, the catalyst concentration and the polymerization temperature, is generally from 5 min to 4 hr, preferably 10 min to 3 hr, more preferably 15 min to 2.5 hr.

As the continuous polymerizer, one polymerizer may be used, or two or more polymerizers may be aligned linearly for use. In the later case, the polymerizers each may have different polymerization conditions capable of attaining different polymer properties.

In the polymerization step ($P_1$) of the present invention, although the polymerization temperature ($T_R$) varies depending on the polymer content (PC) per volume of the polymerization solution in the polymerizer as described later, the polymerization is carried out at a temperature generally from 30° C. to 250° C., preferably 40° C. to 200° C., more preferably 40° C. to 150° C. When the temperature is lower than 30° C., the possibility that the amount of deposited polymers is increased by internal or external disturbance in the polymerizer is increased, and the polymerization temperature is largely under to the lower limit of the optimum temperature of the post-treatment step ($P_2$) to be described later. On this account, it is necessary to employ a temperature-increasing step before the polymer solution is continuously fed to the post-treatment step ($P_2$) and thereby process economy is often damaged. Accordingly, the temperature of lower than 30° C. is not preferable. When the temperature is over 250° C., there is a possibility that thermal decomposition of the polymer itself is induced. Accordingly, the temperature of over 250° C. is not preferable also.

In the polymerization step ($P_1$), the polymerization temperature ($T_R$) preferably satisfies the following formula (Eq-5), more preferably the following formula (Eq-6). When the solution polymerization progresses at a polymerization temperature satisfying the formulas, the solution is always kept homogeneously during the polymerization, and thereby the continuous production can be attained without troubles which disturb continuous operation, caused by deposition of solid polymers, such as pipe clogging, and the syndiotactic propylene polymers having stable qualities can be constantly prepared.

$$(T_{min}-45)<T_R<(T_{min}+50) \tag{Eq-5}$$

$$(T_{min}-40)<T_R<(T_{min}+40) \tag{Eq-6}$$

In the formulas (Eq-5) and (Eq-6), $T_{min}$ (° C.) is the lowest temperature of when the solution viscosity and the temperature of a syndiotactic propylene polymer solution generated by solution polymerization show a linear relationship. $T_{min}$ usually shows a different value depending on the polymer content (PC) or the molecular weight of an aimed syndiotactic propylene polymer. Normally, the lowest temperature $T_{min}$, at which the temperature and the solution viscosity satisfy the linear relationship is determined by a method of separately preparing an aimed syndiotactic propylene polymer in a small scale and measuring a relationship between the temperature and the solution viscosity of the polymer content (PC) of the designed polymer, or by using relationships such as a known Mark-Houwink formula. For example, FIG. 1 shows the fact that in the syndiotactic polypropylene having an intrinsic viscosity [η] of 1.6 dl/g and a melt flow rate (MFR) of 4 g/10 min, when PC is 200 g/L, $T_{min}$ is 83° C., when PC is 100 g/L, $T_{min}$ is 80° C., when PC is 50 g/L, $T_{min}$ is 70° C., and when PC is 30 g/L, $T_{min}$ is 62° C., and further, when in each polymer concentration PC, at a temperature not lower than $T_{min}$, the solution viscosity and the temperature have a linear straight-line relationship. In the usual polymerization operation, the polymerization temperature ($T_R$) is set to be higher than the equilibrium melting temperature ($T_M$).

Therefore, the polymerization in the solution polymerization step ($P_1$) is carried out usually in the following steps.

[Step 1] The quality ($T_m$) of an aimed syndiotactic propylene polymer is determined.

[Step 2] The inert hydrocarbon solvent is selected and the equilibrium melting temperature ($T_M$) is determined by substituting the molar volume ($V_1$) of the solvent, the solubility parameter (δ) of the solvent and the volume fraction ($v_2$) of the syndiotactic propylene polymer for the formula (Eq-2) or the formula (Eq-4). The volume fraction ($v_2$) is selected from the range of 0.005 to 0.50.

[Step 3] The polymerization temperature ($T_R$) is determined according to the formula (Eq-5).

[Step 4] When the relation between the equilibrium melting temperature ($T_M$) and the polymerization temperature ($T_R$) does not satisfy the formula (Eq-1), the above step is repeated with respect to other solvent having different molar volume ($V_1$) and/or solubility parameter ($\delta$). The polymerization condition satisfying the formula (Eq-1) is determined by changing the volume fraction ($v_2$) of the syndiotactic propylene polymer in the range of 0.005 to 0.50 or by varying the polymerization temperature ($T_R$) in the range of inequality expression of the formula (Eq-5).

The polymerization pressure in the polymerization step ($P_1$) is a value, which varies depending on the polymerization temperature or the amount of the solvent used and can be determined to the arbitrary range. Usually, the pressure is more than 0 to 10 MPaG, preferably 0 to 8 MPaG, more preferably to 6 MPaG.

[2] Post-Treatment Step ($P_2$)

The process for producing the syndiotactic propylene polymer of the present invention is characterized by, following the polymerization step ($P_1$), preferably carrying out the post-treatment step ($P_2$) such that the polymerization solution transported from the polymerization step is optionally heated to the temperature range of not lower than the polymerization temperature and not higher than 250° C., and then the solvent is distilled off by flash operation under a pressure of 0.00 to 0.5 MPa in a flash vessel. In the transportation line from the polymerization step ($P_1$) to the post-treatment step ($P_2$), it is preferable to employ a method of transporting the polymer solution (S) by introducing a hydrocarbon having 5 to 12 carbon atoms with pressure at an arbitrary position. As the hydrocarbon having 5 to 12 carbon atoms, the solvent same as the inert hydrocarbon solvent submitted to the solution polymerization reaction is preferably used. In this method, the solvent temperature is set to the range of from the polymerization temperature ($T_R$) to $T_R$+50° C. In the injection to the line, the pressure is usually set to a range from the internal pressure of the polymerization reactor to 10 MPaG.

The preferred embodiment of the flash operation according to the present invention is described below.

In the post-treatment step of the present invention, the continuous flash operation is carried out at a vapor temperature in a flash vessel of from 90 to 250° C., preferably 90 to 220° C., more preferably 90 to 200° C., at an internal pressure of the flash vessel of from 0.00 to 0.5 MPa·G, preferably 0.01 to 0.3 MPa·G. The vapor flashed is discharged continuously from the flash vessel and thereby the monomer and the solvent are recovered. The flash operation of the present invention can decrease the content of the solvent remained in the polymer to the sufficiently low level capable of pelletizing the polymer. Usually, the polymer obtained after flashing contains the solvent in an amount of not more than 2000 weight ppm, preferably not more than 1000 weight ppm, more preferably not more than 500 weight ppm.

In the post-treatment of the present invention, a system of controlling the temperature of the polymer solution continuously discharged from the polymerizer is provided in order to regulate the vapor temperature in the flash vessel to the above range, and a pressure control device of controlling the pressure of the polymer solution is provided. The polymer solution satisfying a prescribed temperature and a prescribed pressure (hereinafter, sometimes referred to as "polymerization solution for flash" is prepared using the system and the device and then continuously injected into the flash vessel. In the continuous line of connecting the polymerizer and the flash vessel, a heating system capable of heating with jacket steam or the like and pressure controlling bulbs for controlling the pressure are usually provided. However, there is no limitation on these systems in the present invention.

The temperature of the polymer solution for flash is from 100 to 250° C., preferably 100 to 220°, more preferably 120 to 200° C.

The pressure of the polymer solution continuously injected into the flash vessel is from 1.0 to 10 MPa·G, preferably 2.0 to 8.0 MPa·G, more preferably 3.0 to 6.0 MPa·G.

When the temperature and the pressure of the polymer solution for flash continuously injected into the flash vessel satisfy the above ranges, continuous production can be carried out effectively without marring the qualities of resulting polymers in the post-treatment of the present invention.

The polymer obtained by the separation of the monomer and the solvent through the flash operation is pelletized by a conventionally known method. For example, it is preferable to employ the method which comprises an extrusion step of extruding a molten polymer, which is continuously discharged from the flash vessel into a strand state, through a nozzle of an extruder, a cut step of preparing pellets by cutting the strand product extruded with a cutter having a rotating blade, a cooling step of cooling the cut pellets in a state of contacting with water, and a dehydration step of separating the cooled pellets and water by a centrifugal dehydrator. However, the method in the present invention is not limited to the method described above.

[3] Syndiotactic Propylene Polymer Obtainable by the Production Process of the Present Invention The syndiotactic propylene polymer of the present invention generally has a skeleton derived from propylene in an amount of not less than 90 mol %, preferably from 93 mol % to 100 mol %, and satisfies all the following properties [1] to [3], preferably all the following properties [1] to [6], and further has excellent moldability, heat resistance, transparency, blocking resistance and balance between mechanical properties and strength.

[1] The syndiotactic pentad fraction (rrrr fraction) as measured by $^{13}$C-NMR is not less than 85%, preferably not less than 90%, more preferably not less than 93%, further preferably not less than 94%.

[2] The intrinsic viscosity [η] measured at 135° C. in decalin is from 0.1 to 10 dl/g, preferably 0.3 to 7 dl/g, more preferably 0.5 to 5 dl/g.

[3] The melting point ($T_m$) determined by a differential scanning calorimeter is not lower than 145° C., preferably not lower than 145° C. and not higher than 170° C., more preferably not lower than 150° C. and not higher than 170° C., further preferably not lower than 155° C. and not higher than 170° C., especially preferably not less than 156° C. and not higher than 170° C.

[4] The heat of fusion (ΔH) is not less than 40 mJ/mg, preferably not less than 50 mJ/mg, more preferably not less than 52 mJ/mg, especially preferably not less than 55 mJ/mg.

[5] The isothermal crystallization temperature $T_{iso}$ as determined by a differential scanning calorimeter and the semi-crystallization time in the isothermal crystallization t1/2 satisfy the following formula (Eq-7), preferably the following formula (Eq-8), more preferably the following formula (Eq-9) in the range $110 \leq T_{iso} \leq 150$ (° C.).

[Formula 7]

$$1.67 \times 10^{-4} \exp(0.10 \times T_{iso}) \leq t_{1/2} \leq 5.56 \times 10^{-4} \exp(0.12 \times T_{iso}) \quad \text{(Eq-7)}$$

[Formula 8]

$$1.67 \times 10^{-4} \exp(0.10 \times T_{iso}) \leq t_{1/2} \leq 3.71 \times 10^{-4} \exp(0.12 \times T_{iso}) \quad \text{(Eq-8)}$$

[Formula 9]

$$1.67 \times 10^{-4} \exp(0.10 \times T_{iso}) \leq t_{1/2} \leq 2.23 \times 10^{-4} \exp(0.12 \times T_{iso}) \quad \text{(Eq-9)}$$

[6] The amount of a part soluble in n-decane is not more than 1 wt %, preferably not more than 0.8 wt %, more preferably not more than 0.6 wt %.

From the viewpoint of improving the capabilities of a molded article and moldability, the syndiotactic propylene polymer of the present invention, further, satisfies the following properties [7] and [8] preferably in addition to the properties [1] to [6].

[7] The melt flow rate as determined at 230° C. under a load of 2.16 kg in accordance with ASTM D-1238 is from 0.01 to 50 g/10 min, preferably 0.1 to 30 g/10 min.

[8] The molecular weight distribution (Mw/Mn) as measured by Gel permeation chromatography (GPC) is from 1.5 to 20, preferably 2.0 to 10.

The syndiotactic propylene polymer of the present invention is optionally blended with additives such as weather stabilizer, heat stabilizer, antistatic agent, anti-slipping agent, anti-blocking agent, forming agent, crystallization assistant, anti-fogging agent, transparent nucleating agent, lubricant, pigment, dye, plasticizer, anti-aging agent, hydrochloric acid absorbent, oxidation inhibitor, mold releasing agent, impact improver or anti-UV agent. Thereafter, the polymer is molded by known heat molding methods, for example, extrusion molding, injection molding, inflation molding, extrusion laminating molding, cast molding, blow molding, extrusion blow molding, injection blow molding, press molding, vacuum molding, calender molding, foaming molding or powder slash molding. In the results, molded articles useful for various uses can be prepared.

EXAMPLES

Hereinafter, the present invention will be described in more detail with reference to the following examples, but the present invention is not restricted by the examples. In the examples, various physical properties were determined in the following manners.

Melt Flow Rate (MFR)

The melt flow rate was measured at 230° C. under a load of 2.16 kg in accordance with ASTM D-1238.

Intrinsic Viscosity [η]

The intrinsic viscosity was measured at 135° C. in a decalin solvent. Namely, about 20 mg of a polymer was dissolved in 15 ml of decalin and a specific viscosity $\eta_{sp}$ was measured in an oil bath at 135° C. To the decalin solution, 5 ml of a decalin solvent was added and the decalin solution was diluted, and then a specific viscosity $\eta_{sp}$ was measured in the same manner. This diluting operation and the measurement of specific viscosity $\eta_{sp}$ were further repeated twice, and when the concentration (C) is extrapolated into 0, the value $\eta_{sp}/C$ was determined as an intrinsic viscosity (referred to the following formula).

$$[\eta] = \lim(\eta_{sp}/C)(C \rightarrow 0)$$

Amount of n-Decane Soluble

To 5 g of a polymer sample, 200 ml of n-decane was added and the sample was dissolved with heat at 145° C. for 30 min. The resulting solution was cooled to 20° C. over about 3 hr, and allowed to stand for 30 min. Thereafter, a deposit (n-decane insoluble) was separated by filtration. The filtrate was introduced into about 3 times the filtrate amount of acetone and thereby a component dissolved in n-decane was deposited. The deposit was separated by filtration from acetone and then dried. When the filtrate was concentrated and dried, no residue was observed. The amount of the n-decane soluble was determined by the following formula.

$$\text{Amount of } \underline{\text{n-decane soluble}} \text{ (wt \%)} = \left[\frac{\text{Weight of deposit}}{\text{Weight of sample}}\right] \times 100$$

Molecular Weight Distribution (Mw/Mn)

The molecular weight distribution (Mw/Mn) was determined using a gel permeation chromatograph Alliance GPC-2000 model manufactured by Waters Co., Ltd in the following manner. As a separation column, two columns of TSK gel GNH6-HT and two columns of TSK gel GNH6-HTL were used (any column had a diameter of 7.5 mm and a length of 300 mm). The column temperature was 140° C., o-dichlorobenzene (manufactured by Wako Pure Chemical Industries, Ltd.) was used as a mobile phase, and 0.025% by weight of BHT (manufactured by Takeda Pharmaceutical Co., Ltd.) was used an oxidation inhibitor, the mobile phase was moved at a rate of 1.0 ml/min, the sample concentration was 15 mg/10 ml, the amount of the sample injected was 500 micro liter, and a differential refractive index detector was used as a detector. For the standard polystyrenes having a molecular weight satisfying Mw<1000 and Mw>4×10$^6$, polystyrene manufactured by Tohso Co., Ltd. was used, and for ones having a molecular weight satisfying $1000 \leq Mw \leq 4 \times 10^6$, polystyrene manufactured by Pressure Chemical Co., was used.

Melting Point ($T_m$) and Heat of Fusion ($\Delta H$)

The melting point ($T_m$) and heat of fusion ($\Delta H$) were determined using DSC Pyris1 or DSC7 manufactured by Perkin Elmer Inc. About 5 mg of a sample was packed in a special aluminum pan, the temperature was increased to 200° C. in a nitrogen atmosphere (nitrogen flow rate: 20 ml/min), and was kept at 200° C. for 10 min. Thereafter, the sample was cooled at a rate of 10° C./min to 30° C. The temperature was kept at 30° C. for 5 min, and then was increased to 200° C. at a rate of 10° C./min. At this time, the melting point was determined from a peak top of a crystalline melt peak, and the heat of fusion was determined from an integrating value of a crystalline melt peak.

In the propylene polymers described in the examples of the present invention, when two peaks were observed, the low temperature side peak was regarded as $T_{m1}$ and the high temperature side peak was defined as $T_{m2}$, and $T_{m2}$ was defined as the melting point ($T_m$).

Half Time of Isothermal Crystallization ($t_{1/2}$)

About 5 mg of a sample was packed in a special aluminum pan, and the temperature of the sample was increased using DSC Pyris1 or DSC7 manufactured by Perkin Elmer Inc. from 30° C. to 200° C. at a rate of 320° C./min and then kept at 200° C. for 5 min. Thereafter, the temperature was decreased from 200° C. to the temperature of isothermal crystallization 110° C. at a rate of 320° C./min. From the DSC curve obtained by keeping each isothermal crystallization temperature, a half time of crystallization ($t_{1/2}$) was obtained. The half time of crystallization ($t_{1/2}$) was determined by taking the starting time for the isothermal crystallization process (the time that the temperature reached the isothermal crystallization temperature from 200° C.) as t=0. The $t_{1/2}$ is usually determined in the above manner. However, for example, when crystallization was not caused at a certain isothermal crystallization temperature, for example at 110° C., measurement was expediently carried out at several points at an isothermal crystallization temperature not higher than 110° C. and the half time of crystallization ($t_{1/2}$) was determined by the extrapolation value.

The solvents for solution polymerization used in the examples and comparative examples according to the present invention are as follows:

cyclohexane,
n-heptane,
solvent A; a mixed solvent which comprises n-hexane (60 to 65% by volume), isohexane (10 to 19% by volume), methylcyclopentane (18 to 22% by volume) and other aliphatic hydrocarbon components (0 to 3% by volume), and
solvent B; a mixed solvent which comprises isohexane (95 to 100% by volume and n-hexane (0 to 5% by volume).

The isohexane which is a constituent of the solvents A and B is a mixed solvent of 2-methylpentane and 3-methyl pentane (in a volume ratio of about 2/1).

Synthetic Example 1

Dibenzylmethylene(cyclopentadienyl)(2,7-diphenyl-3,6-di-tert-butylfluorenyl)zirconium dichloride was produced in the following manner.

(i) Synthesis of 2,7-dibromo-3,6-di-tert-butyl-fluorene

In a nitrogen atmosphere, 15.22 g (54.7 mmol) of 3,6-di-tert-butyl-fluorene synthesized in accordance with a method described in Bull. Chem. Soc. Jpn., 59, 97 (1986) and 170 mL of propylene carbonate were added to a 300 mL three-neck flask, and stirred. To the solution, 20.52 g (115 mmol) of imide N-bromosuccinate was added and the mixture was stirred while heating at 80° C. for 5 hr. Thereafter, the reaction mixture was spontaneously cooled, and then was added to 800 mL of water and stirred at room temperature for 15 min. After the stirring, a solid deposited was separated by filtration. The resulting solid was washed with 10 mL of ethanol five times. Thereafter, to the solid, a mixed solution of n-hexane and a small amount of dichloromethane was added and the mixture was heated to 60° C., thereby the solid was dissolved in the solution completely. The solution was then allowed to stand over night at −20° C. The crystal deposited was washed with 5 mL of hexane three times to prepare an aimed product (in an amount of 21.16 g in a yield of 76%). The identification of the aimed product was carried out by $^1$H NMR and FD-MS spectrum.

$^1$H NMR (270 MHz, CDCl$_3$, TMS): δ1.60 (s, tBu(Flu), 18H), 3.75 (s, Flu-9H, 2H), 7.73 (s, Flu, 2H), 7.81 (s, Flu, 2H).

MS (FD):M/z 436(M+).

(ii) Synthesis of 2,7-diphenyl-3,6-di-tert-butyl-fluorene

In a nitrogen atmosphere, 8.15 g (18.7 mmol) of 2,7-dibromo-3,6-di-tert-butyl-fluorene and 1.08 g (0.93 mmol) of Pd(PPh$_3$) were added to a 300 mL three-neck flask, and then 120 mL of dehydrated 1,2-dimethoxyethane was added and the mixture was stirred at room temperature for 20 min. To the solution obtained, 20 mL of ethanol solution containing 5.01 g (41.1 mmol) of phenyl boric acid was added and the mixture was stirred at room temperature for 20 min, and then 37.4 mL (74.8 mmol) of a 2.0 mol/L sodium carbonate aqueous solution was added. Thereafter, the mixture was refluxed while heating for 18 hr and cooled spontaneously, and then quenched with dilute hydrochloric acid in an ice bath. The soluble part was extracted by adding ether, and the organic layer was washed with a saturated sodium hydrogen carbonate aqueous solution twice, with water twice and with saturated brine twice, and then dried with magnesium sulfate. Thereafter, the solvent was distilled off and the resulting solid was separated with a column chromatography to prepare an aimed product (in an amount of 4.36 g in a yield of 54%). The identification of the aimed product was carried out by $^1$H-NMR and FD-MS spectrum.

$^1$H-NMR (270 MHz, CDCl$_3$, TMS): δ1.29 (s, tBu(Flu), 18H), 3.78 (s, Flu-9H, 2H), 7.16 (s, Flu, 2H), 7.34 (br, PhFlu, 10H), 7.97 (s, Flu, 2H).

MS (FD):M/z 430(M+).

(iii) Synthesis of 6,6-dibenzofulvene

In a nitrogen atmosphere, 8.0 g (121 mmol) of cyclopentadiene and 100 mL of dehydrated tetrahydrofurane were added to a 500 mL three-neck flask, and stirred. The mixed solution was cooled in an ice bath, and 80 mL (125.6 mmol) of a 1.57 mmol/L hexane solution of n-butyl lithium was added. Thereafter, the mixture was stirred at room temperature for 3 hr and the resulting white slurry was cooled in an ice bath, and then a solution prepared by dissolving 25.0 g (118 mmol) of 1,3-diphenyl-2-propanone in 50 mL of dehydrated tetrahydrofurane was added. Thereafter, the mixture was stirred at room temperature for 12 hr, and the resulting yellow solution was quenched with a saturated ammonium chloride aqueous solution. 100 mL of n-hexane was added to the solution and thereby the soluble part was extracted. The organic phase was washed with water and saturated brine, and then dried with magnesium sulfate. The solvent was distilled off, and the residue was purified with a column chromatography to prepare an aimed yellow solid (in an amount of 3.7 g in a yield of 12%). The identification of the aimed product was carried out by $^1$H-NMR.

$^1$H-NMR (270 MHz, CDCl$_3$, TMS): δ3.69 (s, PhCH$_2$, 4H), 6.60-6.72 (m, Cp, 4H), 7.13-7.32 (m, PhCH$_2$, 10H).

(iv) Synthesis of dibenzylmethylene (cyclopentadienyl)(2,7-diphenyl-3,6-di-tert-butylfluorene)

In a nitrogen atmosphere, 30 mL of dehydrated tetrahydrofurane was added to 1.60 g (3.71 mmol) of 2,7-diphenyl-3,6-di-tert-butylfluorene and the mixture was stirred. The solution obtained was cooled in an ice bath, and then 2.65 mL (4.13 mmol) of a 1.56 mol/L hexane solution of n-butyl lithium was added to the solution and the mixture was stirred at room temperature for 2 hr. The resulting red solution was cooled to −78° C. in a dry ice-methanol bath, and 20 mL of tetrahydrofuran containing 1.06 g (4.10 mmol) of 6,6-dibenzofurvene was dropped over 20 min to the solution. Thereafter, the mixture was stirred for 18 hr while the temperature was gradually increased to room temperature. To the resulting red-black solution, 60 mL of 1N hydrochloric acid was added, and thereby the reaction was terminated. The separation of the liquid was carried out by adding 80 mL of diethylether, and thereby the soluble part was extracted. This organic layer was washed with saturated sodium hydrogen carbonate aqueous solution twice, with water twice, and with saturated brine once, and then dried with magnesium sulfate. The solvent was distilled off and a white-yellow powdery aimed product was obtained (in an amount of 0.59 g in a yield of 23%) by purification with silica gel chromatography. The identification of the aimed product was carried out by $^1$H-NMR and FD-MS spectrum.

$^1$H-NMR (270 MHz, CDCl$_3$, TMS): δ1.25 (s, tBu (Flu), 18H), 2.66 (br, CpH, 1H), 3.22 (br, CH$_2$Ph, 4H), 4.41 (br,

Flu-9H, 1H), 5.85-6.51 (m, Cp, 4H), 6.82-7.40 (m, Ph (Flu) and CH$_2$Ph and Flu, 22H), 7.67 (s, Flu, 2H).

MS (FD):M/z 688 (M+).

(v) Synthesis of dibenzylmethylene(cyclopentadienyl)(2,7-diphenyl-3,6-di-tert-butylfluorenyl)zirconium dichloride In a nitrogen atmosphere, 0.59 g (0.855 mmol) of dibenzylmethylene(cyclopentadienyl)(2,7-diphenyl-3,6-di-tert-butylfurorene, and 40 mL of dehydrated diethylether were added to a 100 mL Schlenk tube and stirred. This mixed slurry solution was cooled in an ice bath, and 1.21 mL (1.88 mmol) of a 1.56 mol/L hexane solution of n-butyl lithium was added to the slurry solution, and the mixture was stirred for 45 hr while the temperature was increased to room temperature gradually. The red reaction liquid was cooled to −78° C. in a dry ice-methanol bath, and then 0.200 g (0.858 mmol) of zirconium tetrachloride was added thereto. Thereafter, the solution was stirred for 42 hr while the temperature was increased to room temperature gradually, to prepare a reddish and orange suspension liquid. The solvent was distilled off under a reduced pressure and then the resultant was dissolved in n-hexane in a nitrogen atmosphere, passed through a glass filter packed with Celite, and then washed with n-hexane. The orange powder insoluble in n-hexane was subjected to extraction by dichloromethane. The solvent of the soluble part in dichloromethane was distilled off and the residue was washed with diethylether/cold n-pentane, and dried to prepare the aimed product as an orange powder (in an amount of 515 mg in a yield of 71%). The identification of the aimed product was carried out by $^1$H-NMR and FD-MS spectrum.

$^1$H-NMR (270 MHz, CDCl$_3$, TMS): δ1.30 (s, tBu (Flu), 18H), 3.82 (d, J=15.5 Hz, CH$_2$Ph, 2H), 3.93 (d, J=15.5 Hz, CH$_2$Ph, 2H), 5.80 (t, J=2.6 Hz, Cp, 2H), 6.25 (t, J=2.6 Hz, Cp, 2H), 6.97-7.34 (m, Ph(Flu) and CH$_2$Ph, 20H), 7.37 (s, Flu, 2H), 8.32 (s, Flu, 2H).

MS (FD):M/z 848 (M+).

Example 1

To a 1 L internal volume stainless steel autoclave thoroughly purged with nitrogen, 150 mL of cyclohexane and 150 mL of n-heptane were fed and the internal temperature of the autoclave was kept at 45° C. for 20 min while passing propylene in an amount of 30 L/hr. On the other hand, to a 30 mL internal volume side-arm flask thoroughly purged with nitrogen, a magnetic stirrer was put and the flask was charged with 212.3 mmol (3.46 mol/L in terms of aluminum atom) of a hexane slurry of TMAO-341 (manufactured by Tohso Fine Chem Co., Ltd.) and 0.5 μmol of dibenzylmethylene(cyclopentadienyl)(2,7-diphenyl-3,6-di-tert-butylfluorenyl)zirconium dichloride prepared in Synthetic Example 1, and then further charged with n-heptane. The mixture was stirred for 1 hr. The resulting solution was added to a mixed solvent of cyclohexane and n-heptane (volume ratio of 1:1) in a stainless steel autoclave through which propylene had been passed, and polymerization was started. Thereafter, the polymerization was carried out at 50° C. for 1 hr while the total pressure was kept to 0.5 MPa-G by passing only propylene continuously. Since the control of exothermic heat during the polymerization was easy, the mixture in the autoclave was presumed to be in a homogenous condition in the polymerization. After the completion of polymerization, the pressure was released while keeping the temperature at 50° C. to be brought into ordinary pressure. Thereafter, unreacted propylene was purged while keeping the temperature at 50° C. It was confirmed that the polymer solution was in a homogenous condition, by the visual observation for the polymer solution in the autoclave after a top plate of the autoclave was opened. The resulting uniform polymer solution was put into an excess amount of methanol to deposit a polymer. The polymer was dried under a reduced pressure at 80° C. for 12 hr and 30.61 g of the polymer was obtained. The polymerization activity of the polypropylene polymerization was 61.2 kg/mmol-Zr·hr, and the resulting polymer had an intrinsic viscosity [η] of 1.66 dl/g, MFR of 3.4 g/10 min, Tm$_1$ of 155° C., Tm$_2$ of 160° C., a rrrr fraction of 94.3% and an amount of the n-decane soluble of not more than 0.6% by weight. The equilibrium melting temperature ($T_M$) determined from the formula (Eq-1) and the difference ($T_m$-$T_R$) between $T_M$ and the polymerization temperature ($T_R$) according to the present invention are summarized in Table 2.

Example 2

The procedure of the Example 1 was repeated except that 300 mL of n-heptane was used as a solvent for solution polymerization, and the internal temperature of the autoclave was kept at 60° C. before and during the polymerization reaction. It was difficult to say that the control of exothermic heat during the polymerization was easy, but the polymerization could be carried out while controlling the polymerization condition, therefore it was presumed that the polymerization proceeded in a state (white-turbidity state) that a part of the polymer was deposited. After the completion of polymerization, the pressure was released while keeping the temperature at 60° C. to be brought into ordinary pressure. Thereafter, unreacted propylene was purged while keeping the temperature at 60° C. It was confirmed that the polymer solution was in a white-turbidity state, by the visual observation for the polymer solution in the autoclave after a top plate of the autoclave was opened. The amount of the resulting polymer was 26.80 g. The polymerization activity of the polypropylene polymerization was 53.6 kg/mmol-Zr·hr, and the resulting polymer had an intrinsic viscosity [η] of 1.47 dl/g, MFR of 6.9 g/10 min, Tm$_1$ of 152° C., Tm$_2$ of 158° C. and an amount of the n-decane soluble of not more than 0.6% by weight. The equilibrium melting temperature ($T_M$) determined from the formula (Eq-1) and the difference ($T_m$-$T_R$) between $T_M$ and the polymerization temperature ($T_R$) according to the present invention are summarized in Table 2.

Example 3

The procedure of the Example 1 was repeated except that 75 mL of cyclohexane and 225 mL of n-heptane were used as a solvent for solution polymerization. It was difficult to say that the control of exothermic heat during the polymerization was easy, but the polymerization could be carried out while controlling the polymerization condition, it was presumed the polymerization proceeded in a white-turbidity state that a part of the polymer was deposited. After the completion of polymerization, the pressure was released while keeping the temperature at 50° C. to be brought into ordinary pressure. Thereafter, unreacted propylene was purged while keeping the temperature at 50° C. It was confirmed that the polymer solution was in a white-turbidity state, by the visual observation for the polymer solution in the autoclave after a top plate of the autoclave was opened. The amount of the resulting polymer was 10.54 g. The polymerization activity of the polypropylene polymerization was 21.1 kg/mmol-Zr·hr, and the resulting polymer had an intrinsic viscosity [η] of 1.70 dl/g, MFR of 3.2 g/10 min, Tm$_1$ of 155° C., and Tm$_2$ of 161°

C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Example 4

The procedure of the Example 1 was repeated except that 300 mL of cyclohexane was used as a solvent for solution polymerization. Since the control of exothermic heat during the polymerization was easy, it was presumed the polymerization proceeded in a homogenous condition. After the completion of polymerization, the pressure was released while keeping the temperature at 50° C. to be brought into ordinary pressure. Thereafter, unreacted propylene was purged while keeping the temperature at 50° C. It was confirmed that the polymer solution was in a homogenous condition, by the visual observation for the polymer solution in the autoclave after a top plate of the autoclave was opened. The amount of the resulting polymer was 41.23 g. The polymerization activity of the polypropylene polymerization was 82.5 kg/mmol-Zr·hr, and the resulting polymer had an intrinsic viscosity [η] of 1.50 dl/g, MFR of 6.1 g/10 min, $Tm_1$ of 151° C. and $Tm_2$ of 159° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Comparative Example 1

The procedure of the Example 1 was repeated except that 300 mL of n-heptane was used as a solvent for solution polymerization, and the internal temperature of the autoclave was kept at 40° C. before and during the polymerization reaction. After the start of polymerization, the removal of heat in a polymerizer became difficult and then the polymerization was stopped. After the stop of polymerization, the pressure was released while keeping the temperature at 40° C. to be brought into ordinary pressure. Thereafter, unreacted propylene was purged while keeping the temperature at 40° C. It was confirmed that a significant amount of a polymer deposited, by the visual observation for the polymer solution in the autoclave after a top plate of the autoclave was opened. The amount of the resulting polymer was 26.22 g. The polymerization activity of the polypropylene polymerization was 52.4 kg/mmol-Zr·hr, and the resulting polymer had an intrinsic viscosity [η] of 2.12 dl/g, MFR of 1.2 g/10 min, $Tm_1$ of 157° C. and $Tm_2$ of 162° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Comparative Example 2

The procedure of the Example 1 was repeated except that the internal temperature of the autoclave was kept at 40° C. before and during the polymerization reaction, and the polymerization time was changed to 55 min. After the start of polymerization, the removal of heat in a polymerizer became difficult and then the polymerization was stopped. After the stop of polymerization, the pressure was released while keeping the temperature at 40° C. to be brought into ordinary pressure. Thereafter, unreacted propylene was purged while keeping the temperature at 40° C. It was confirmed that a significant amount of a polymer was deposited, by the visual observation for the polymer solution in the autoclave after a top plate of the autoclave was opened. The amount of the resulting polymer was 59.95 g. The polymerization activity of the propylene polymerization was 130.8 kg/mmol-Zr·hr, and the resulting polymer had an intrinsic viscosity [η] of 1.86 dl/g, MFR of 2.2 g/10 min, $Tm_1$ of 156° C. and $Tm_2$ of 161° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Comparative Example 3

The procedure of the Example 1 was repeated except that 300 mL of cyclohexane was used as a solvent for solution polymerization, and the internal temperature of the autoclave was kept at 40° C. before and during the polymerization reaction. After the start of polymerization, the removal of heat in a polymerizer became difficult and then the polymerization was stopped. After the stop of polymerization, the pressure was released while keeping the temperature at 40° C. to be brought into ordinary pressure. Thereafter, unreacted propylene was purged while keeping the temperature at 40° C. It was confirmed that a significant amount of a polymer was deposited, by the visual observation for the polymer solution in the autoclave after a top plate of the autoclave was opened. The amount of the resulting polymer was 76.13 g. The polymerization activity of the propylene polymerization was 152.3 kg/mmol-Zr·hr, and the resulting polymer had an intrinsic viscosity [η] of 1.78 dl/g, MFR of 3.1 g/10 min, and $Tm_1$ of 157° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Example 5

The procedure of the Example 1 was repeated except that 300 mL of the solvent B was used as a solvent for solution polymerization and the internal temperature of the autoclave was kept at 60° C. before and during the polymerization reaction. Since the control of exothermic heat during the polymerization was easy, it was presumed that the polymerization proceeded in a homogenous condition. After the completion of polymerization, the pressure was released while keeping the temperature at 60° C. to be brought into ordinary pressure. Thereafter, unreacted propylene was purged while keeping the temperature at 60° C. It was confirmed that the polymer solution was in a homogenous condition, by the visual observation for the polymer solution in the autoclave after a top plate of the autoclave was opened. The amount of the resulting polymer was 21.61 g. The polymerization activity of the polypropylene polymerization was 43.2 kg/mmol-Zr·hr, and the resulting polymer had an intrinsic viscosity [η] of 1.41 dl/g, MFR of 7.5 g/10 min, $Tm_1$ of 149° C. and $Tm_2$ of 157° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Example 6

The procedure of the Example 1 was repeated except that 150 mL of cyclohexane and 150 mL of the solvent B were used as a solvent for solution polymerization. Since the control of exothermic heat during the polymerization was easy, it was presumed that the polymerization proceeded in a homogenous condition. After the completion of polymerization, the pressure was released while keeping the temperature at 50° C. to be brought into ordinary pressure. Thereafter, unreacted propylene was purged while keeping the temperature at 50° C. It was confirmed that the polymer solution was in a homogenous condition, by the visual observation for the polymer solution in the autoclave after a top plate of the autoclave was opened. The amount of the resulting polymer was 37.29 g. The polymerization activity of the polypropylene polymerization was 74.6 kg/mmol-Zr·hr, and the resulting polymer had an intrinsic viscosity [η] of 1.55 dl/g, MFR of 5.0 g/10 min, $Tm_1$ of 154° C. and $Tm_2$ of 159° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Comparative Example 4

The procedure of the Example 1 was repeated except that 300 mL of the solvent B was used as a solvent for solution polymerization. After the start of polymerization, the removal of heat in a polymerizer became difficult and then the polymerization was stopped. After the stop of polymerization, the pressure was released while keeping the temperature at 50° C. to be brought into ordinary pressure. Thereafter, unreacted propylene was purged while keeping the temperature at 50° C. It was confirmed that a significant amount of a polymer was deposited, by the visual observation for the polymer solution in the autoclave after a top plate of the autoclave was opened. The amount of the resulting polymer was 37.92 g. The polymerization activity of the polypropylene polymerization was 75.8 kg/mmol-Zr·hr, and the resulting polymer had an intrinsic viscosity [η] of 1.73 dl/g, MFR of 3.1 g/10 min, $Tm_1$ of 154° C. and $Tm_2$ of 159° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Comparative Example 5

The procedure of the Example 1 was repeated except that 75 mL of cyclohexane and 225 mL of the solvent B were used as a solvent for solution polymerization. After the start of polymerization, the removal of heat in a polymerizer became difficult and then the polymerization was stopped. After the stop of polymerization, the pressure was released while keeping the temperature at 50° C. to be brought into ordinary pressure. Thereafter, unreacted propylene was purged while keeping the temperature at 50° C. It was confirmed that a significant amount of a polymer was deposited, by the visual observation for the polymer solution in the autoclave after a top plate of the autoclave was opened. In the visual observation of syndiotactic polypropylene separately prepared in a glass vessel, a significant amount of a polymer deposited in the above polymerization conditions. The amount of the resulting polymer was 47.07 g. The had a polymerization activity of the polypropylene polymerization was 94.1 kg/mmol-Zr·hr, and the resulting polymer had an intrinsic viscosity [η] of 1.63 dl/g, MFR of 3.8 g/10 min, $Tm_1$ of 154° C. and $Tm_2$ of 159° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Example 7

The procedure of the Example 1 was repeated except that 300 mL of the solvent A was used as a solvent for solution polymerization, and the internal temperature of the autoclave was kept at 60° C. before and during the polymerization. Since the control of exothermic heat during the polymerization was easy, it was presumed that the polymerization proceeded in a homogenous condition. After the completion of polymerization, the pressure was released while keeping the temperature at 60° C. to be brought into ordinary pressure. Thereafter, unreacted propylene was purged while keeping the temperature at 60° C. It was confirmed that the polymer solution was in a homogenous condition, by the visual observation for the polymer solution in the autoclave after a top plate of the autoclave was opened. The amount of the resulting polymer was 22.84 g. The polymerization activity of the polypropylene polymerization was 45.7 kg/mmol-Zr·hr, and the resulting polymer had an intrinsic viscosity [η] of 1.42 dl/g, MFR of 8.0 g/10 min, $Tm_1$ of 149° C. and $Tm_2$ of 157° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

Example 8

The procedure of the Example 1 was repeated except that 300 mL of the solvent A was used as a solvent for solution polymerization. It was difficult to say that the control of exothermic heat during the polymerization was easy, but the polymerization could be carried out while controlling the polymerization condition, it was presumed that the polymerization proceeded in a white-turbidity state that a part of the polymer was deposited. After the completion of polymerization, the pressure was released while keeping the temperature at 50° C. to be brought into ordinary pressure. Thereafter, unreacted propylene was purged while keeping the temperature at 50° C. It was confirmed that the polymer solution was in a white-turbidity state, by the visual observation for the polymer solution in the autoclave after a top plate of the autoclave was opened. The amount of the resulting polymer was 31.03 g. The polymerization activity of the polypropylene polymerization was 62.1 kg/mmol-Zr·hr, and the resulting polymer had an intrinsic viscosity [η] of 1.70 dl/g, MFR of 4.6 g/10 min, $Tm_1$ of 154° C. and $Tm_2$ of 160° C. The equilibrium melting temperature ($T_M$) determined from the formula (Eq-1) and the difference ($T_M$-$T_R$) between $T_M$ and the polymerization temperature ($T_R$) according to the present invention are summarized in Table 2.

TABLE 2

| | Solvent for solution polymerization (volume ratio) | Polymerization temperature ($T_R$) ° C. | Condition of solution during polymerization | Volume fraction of polymer ($v_2$) | Equilibrium melting temperature ($T_M$) ° C. | $T_M - T_R$ ° C. |
|---|---|---|---|---|---|---|
| Ex. 1 | cyclohexane/ n-heptane mixed | 50 | dis- solution | 0.12 | 92.35 | 42.35 |

TABLE 2-continued

| | Solvent for solution polymerization (volume ratio) | Polymerization temperature ($T_R$) °C. | Condition of solution during polymerization | Volume fraction of polymer ($v_2$) | Equilibrium melting temperature ($T_M$) °C. | $T_M - T_R$ °C. |
|---|---|---|---|---|---|---|
| | solvent (50:50) | | | | | |
| Ex. 2 | n-heptane | 60 | white-turbidity state | 0.10 | 100.4 | 40.4 |
| Ex. 3 | cyclohexane/n-heptane mixed solvent (25:75) | 50 | white-turbidity state | 0.04 | 91.63 | 41.63 |
| Ex. 4 | cyclohexane | 50 | dissolution | 0.16 | 89.19 | 39.19 |
| Ex. 5 | solvent B | 60 | dissolution | 0.08 | 95.81 | 35.81 |
| Ex. 6 | cyclohexane/solvent B mixed solvent (50:50) | 50 | dissolution | 0.14 | 90.91 | 40.91 |
| Ex. 7 | solvent A | 60 | dissolution | 0.09 | 91.93 | 31.93 |
| Ex. 8 | solvent A | 50 | white-turbidity state | 0.12 | 93.81 | 43.81 |
| Com. Ex. 1 | n-heptane | 40 | deposition | 0.10 | 100.4 | 60.4 |
| Com. Ex. 2 | cyclohexane/n-heptane mixed solvent (50:50) | 40 | deposition | 0.23 | 99.59 | 59.59 |
| Com. Ex. 3 | cyclohexane | 40 | deposition | 0.30 | 98.9 | 58.9 |
| Com. Ex. 4 | solvent B | 50 | deposition | 0.15 | 99.8 | 49.8 |
| Com. Ex. 5 | cyclohexane/solvent B mixed solvent (25:75) | 50 | deposition | 0.18 | 97.02 | 47.02 |

Example 9

To one feed opening of a 310 L volume continuous polymerizer, the solvent A dehydrated to be purified was fed at a rate of 75 L/hr, and to another feed opening, a hexane slurry of TMA-341 (125 mmol/L in terms of aluminum atom) manufactured by Tohso Fine Chem Co., Ltd. was fed at a rate of 0.1 L/hr and a solution of solvent A (0.25 mmol/L) of dibenzylmethylene (cyclopentadienyl)(2,7-diphenyl-3,6-di-tert-butylfluorenyl)zirconium dichloride prepared in Synthetic Example 1 was fed at a rate of 0.4 L/hr continuously (total of the solvent A was 75.5 L/hr). Simultaneously, to the other feed opening of the polymerizer, propylene was continuously fed at a rate of 12.4 kg/hr and continuous solution polymerization was carried out at a polymerization temperature of from 60 to 70° C., under the total pressure of from 0.5 to 0.7 MPaG at a retention time of 1.0 hr. The control of exothermic heat during the polymerization was extremely easy. It was confirmed the polymer solution was in a homogenous condition from an inspection watch window with which the polymerizer was equipped.

The solution of solvent A of polypropylene produced in the polymerizer was continuously discharged at a flow rate of 100 L/hr through a draining port provided on the polymerizer bottom and introduced into a connecting pipe whose jacket part was heated with a 25 kg/cm² steam so that the temperature of the solution of solvent A of polypropylene was kept at from 70 to 180° C. On the position just close to the connecting pipe, a feed opening for injecting methanol, which was a catalyst quencher, was provided and methanol was joined together with the solution of solvent A by injecting at a rate of about 0.1 L/hr. The solution of solvent A kept at about 180° C. in the connecting pipe equipped with the stream jacket was continuously transported into a flash vessel at a rate of about 100.1 L/hr while regulating the opening of a pressure controlling valve provided at the end of the connecting pipe so that the pressure was kept to be about 4 MpaG. In the transportation to the flash vessel, the solution temperature and the opening of a pressure controlling valve were set so that the pressure in the flash vessel was kept to be about 0.1 MpaG, and the temperature of the vapor part in the flash vessel was kept to be about 190° C. As a result, a polypropylene was obtained at a production rate of 7.0 to 8.0 kg/hr. The polymerization activity of polypropylene polymerization was 67.1 kg/mmol-Zr·hr, and the resulting polypropylene had an number average molecular weight of 92,000 and a weight average molecular weight of 19,9000, as measured by GPC, an intrinsic viscosity [η] of 1.5 dl/g, $Tm_1$ of 148° C., $Tm_2$ of 156° C., a rrrr fraction of 93.1% and an amount of the n-decane soluble of not more than 0.6% by weight.

Comparative Example 6

The continuous polymerization was carried out in the condition of Example 1 except that the polymerization temperature was 30° C. After 5 hr from the start of the polymerization, the removal of heat in the polymerizer became difficult and the polymerization was stopped.

Example 10

To one feed opening of a 310 L volume continuous polymerizer, the solvent A dehydrated and purified was fed at a rate of 33 L/hr and cyclohexane was fed at a rate of 33 L/hr, and to another feed opening, TMAO-341 (150 mmol/L in terms of aluminum atom), and a solution of the solvent A (0.30 mmol/L) of dibenzylmethylene(cyclopentadienyl)(2,7-diphenyl-3,6-di-tert-butylfluorenyl)zirconium dichloride prepared in Synthetic Example 1 at a rate of 0.15 L/hr were fed continuously (the total solvent: 66 L/hr). Simultaneously, to the other feed opening of the polymerizer, propylene was continuously fed at a rate of 15.9 kg/hr and continuous solution polymerization was carried out at a polymerization temperature of 55° C., under the total pressure of 0.7 MPaG for a retention time of 1.0 hr. The control of exothermic heat during the polymerization was extremely easy. It was confirmed that the polymer solution was in a homogenous condition, from an inspection window with which polymerizer was equipped.

The solution of the solvent A of polypropylene produced in the polymerizer was continuously discharged in a flow rate of 100 L/hr through a draining port provided on the polymerizer bottom and introduced into a connecting pipe whose jacket part was heated with a 25 kg/cm$^2$ steam so that the temperature of the solution of the solvent A of polypropylene was kept at from 70 to 180° C. On the position just close to the connecting pipe, a feed opening for injecting methanol, which was a catalyst quencher, was provided and methanol was joined together with the hexane solution by injecting at a rate of about 10 L/hr. The hexane solution kept at about 180° C. in the connecting pipe equipped with the stream jacket was continuously transported into a flash vessel at a rate of about 100 L/hr while regulating the opening of a pressure controlling valve provided at the end of the connecting pipe so that the pressure was kept to be about 4 MpaG. In the transportation to the flash vessel, the solution temperature and the opening of the pressure controlling valve were set so that the pressure in the flash vessel was kept to be about 0.1 MpaG, and the temperature of the vapor part in the flash vessel was kept to be about 190° C. As a result, a polypropylene was obtained in a production rate of 4.0 to 6.0 kg/hr. The polymerization activity of the polypropylene polymerization was 95.6 kg/mmol-Zr·hr, and the resulting polypropylene had an MFR of 4.9 g/10 min, Tm$_1$ of 154° C. and Tm$_2$ of 160° C.

The continuous polymerization in Example 10 was carried out except that the polymerization temperature was 60° C. and only the solvent A was used as a solvent. After 5 hr from the start of the polymerization, the removal of heat in the polymerizer became difficult and the polymerization was stopped.

Example 11

To one feed opening of a 1.0 L volume continuous polymerizer, the solvent A dehydrated and purified was fed at a rate of 0.32 L/hr, and to another feed opening, a hexane slurry of TMAO-341 (50 mmol/L in terms of aluminum atom) and a solvent A-containing solution (0.1 mmol/L) of dibenzylmethylene (cyclopentadienyl)(2,7-diphenyl-3,6-di-tert-butylfluorenyl)zirconium dichloride at a rate of 0.012 L/hr were fed continuously (the total of the solvents: 0.65 mL/hr). Simultaneously, to the other feed opening of the polymerizer, propylene was continuously fed at a rate of 327 ml/hr and continuous solution polymerization was carried out at a polymerization temperature of 50° C., under the total pressure of 3.6 MPaG for a retention time of 1.0 hr. The control of exothermic heat during the polymerization was extremely easy. It was confirmed that the polymer solution was in a homogenous condition, from an inspection window with which the polymerizer was equipped.

The polypropylene solution of the solvent A produced in the polymerizer was continuously discharged at a flow rate of 1 L/hr through a draining port provided on the polymerizer bottom and introduced into a connecting pipe whose jacket part was heated with a 10 kg/cm$^2$ steam so that the solution of solvent A of polypropylene was kept at a temperature from 50 to 80° C. On the position just close to the connecting pipe, a feed opening for injecting methanol, which was a catalyst quencher, was provided and methanol was joined together with the solution of solvent A by injecting at a rate of about 0.15 L/hr. The hexane solution kept at about 70° C. in the connecting pipe equipped with the stream jacket was continuously transported into a flash vessel at a rate of about 1 l/hr while regulating the opening of a pressure controlling valve provided at the end of the connecting pipe so that the pressure was kept to be about 3.6 MpaG. In the transportation to the flash vessel, the opening of the pressure controlling valve was set so that the pressure in the flash vessel was kept to be about 3.6 MpaG. As a result, a polypropylene was obtained in a production rate of 70 g/hr. The polymerization activity of the polypropylene polymerization was 95.6 kg/mmol-Zr·hr, and the resulting polypropylene had an MFR of 4.3 g/10 min, Tm$_1$ of 154° C., Tm$_2$ of 160° C., and a rrrr fraction of 95.2%.

The continuous polymerization was carried out in the condition of Example 11 except that the polymerization temperature was 60° C. After 5 hr from the start of the polymerization, the removal of heat in the polymerizer was difficult and the polymerization was stopped.

Example 12

To one feed opening of a 2000 L volume (working volume of 600 L) continuous polymerizer, a mixed solvent of cyclohexane and the solvent B (mixing ratio of 1:1), which are dehydrated and purified, was fed at a rate of 370 L/hr, and to another feed opening, a pre-mixed solution of the solvent B (0.30 mmol/L) of a hexane slurry of TMAO-341 (150 mmol/L in terms of aluminum atom) manufactured by Tohso Fine Chem Co., Ltd. and a solution of solvent B (0.30 mmol/L) of dibenzylmethylene (cyclopentadienyl)(2,7-diphenyl-3,6-di-tert-butylfluorenyl)zirconium dichloride were continuously fed at a rate of 0.32 L/hr (total solution: 370.32 L/hr). Simultaneously, to the other feed opening of the polymerizer, propylene was continuously fed at a rate of 85.0 kg/hr and continuous solution polymerization was carried out at a polymerization temperature of from 55 to 57° C., under the total pressure of from 0.7 to 0.75 MPaG for a retention time of 1.0 hr. The control of exothermic heat during the polymerization was extremely easy. It was confirmed that the polymer solution was in a homogenous condition, from an inspection window with which the polymerizer was equipped.

The polypropylene mixed solution of cyclohexane and the solvent B (mixing ratio of 1:1) produced in the polymerizer was continuously discharged at a flow rate of 600 L/hr through a draining port provided on the polymerizer bottom and introduced into a connecting pipe which jacket part was heated with a 3 to 25 kg/cm² steam so that the polypropylene mixed solution of cyclohexane and the solvent B (mixing ratio of 1:1) was kept at a temperature from 150 to 190° C. On the position just close to the connecting pipe, a feed opening for injecting methanol, which was a catalyst quencher, was provided and methanol was joined together with the mixed solvent of cyclohexane and the solvent B (mixing volume ratio of 1:1) by injecting at a rate of about 0.75 L/hr. The mixed solution of cyclohexane and the solvent B (mixing ratio: 1:1) kept at about 190° C. in the connecting pipe equipped with the stream jacket was continuously transported into a flash vessel at a rate of about 600.75 L/hr while regulating the opening of a pressure controlling valve provided at the end of the connecting pipe so that the pressure was kept to be about 4.3 MpaG. In the transportation to the flash vessel, the solution temperature and the opening of the pressure controlling valve were set so that the pressure in the flash vessel was kept to be about 0.1 MpaG, and the temperature of the vapor part in the flash vessel was kept to be about 180° C. As a result, a polypropylene was obtained in a production rate of 20 to 25 kg/hr. The polymerization activity of the polypropylene polymerization was 257 kg/mmol-Zr·hr, and the resulting polypropylene had a number average molecular weight of 104,000 and a weight average molecular weight of 197,000, as measured by GPC, an intrinsic viscosity [η] of 1.54 dl/g, $Tm_1$ of 155° C., $Tm_2$ of 160° C. and a rrrr fraction of 92.7%.

POSSIBILITY OF INDUSTRIAL USE

Syndiotactic propylene polymers having a narrow composition distribution, a high melting point and a high molecular weight can be prepared with high activity and high efficiency by the production process with the solution polymerization according to the present invention. The resulting polymers are raw material resins useful in the field of various molding materials such as films and the like. Therefore, the production process of the present invention has a great influence on the industrial world.

The invention claimed is:
1. A process for producing a syndiotactic propylene polymer having a syndiotactic pentad fraction (rrrr fraction), as measured by ¹³C-NMR, of at least 85%, a melting point (Tm), as measured by DSC, of from 145° C. to 170° C., and an intrinsic viscosity [η] of 0.1 to 10 dl/g,
   wherein said process comprises a step ($P_1$) of solution polymerizing, without deposition of polymers, propylene singly or propylene and at least one monomer selected from ethylene and an α-olefin having 4 to 10 carbon atoms at a polymerization temperature ($T_R$) of from 30° C. to 250° C. in an inert hydrocarbon solvent, which contains at least one hydrocarbon selected from aliphatic hydrocarbons and alicyclic hydrocarbons, in the presence of an olefin polymerization catalyst which comprises;
(A) a bridged metallocene compound represented by the following formula (I), and
(B) at least one compound selected from
   (b-1) an organoaluminum oxy compound,
   (b-2) a compound capable of forming an ion pair by reacting with the metallocene compound (A), and
   (b-3) an organoaluminum compound

[Chem. 1]

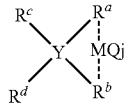
(I)

in which M is a titanium atom, a zirconium atom or a hafnium atom, Q is selected from a halogen atom, a hydrocarbon group, an anion ligand and a neutral ligand coordinatable with a lone electron pair, j is an integer of 1 to 4, $R^a$ and $R^b$ may be identically or differently a single nuclear or polynuclear hydrocarbon residue capable of forming a sandwich structure together with M, Y is a carbon atom or a silicon atom, and $R^c$ and $R^d$ may be the same or different from each other, is selected from hydrogen, a hydrocarbon group and a silicon atom-containing group and further may be bonded to each other to form a ring, wherein the equilibrium melting temperature $T_M$ ([K]), which is calculated from the melting point $T_m$ ([K]) of the syndiotactic propylene polymer solubility parameter $\delta_1$ ([MPa]$^{1/2}$]) of the inert solvent, molar volume of the solvent $V_1$ ([cm³/mol]) and the volume fraction $v_2$ ([-]) of the syndiotactic propylene polymer, and the polymerization temperature $T_R$ ([K]) satisfy the following formula (Eq-1)

$$T_M - T_R \leq 45° C. \tag{Eq-1}$$

and said process further comprises, following the polymerization step ($P_1$), a post-treatment step ($P_2$) of optionally heating a polymer solution (S) discharged from the polymerization step to the temperature not lower than the polymerization temperature and not higher than 250° C., and then carrying out flash procedure at a pressure in a flash vessel of from 0.00 to 0.5 MPa·G thereby distilling off the solvent and the monomer.

2. The process as claimed in claim 1, wherein the step ($P_1$) is carried out continuously.

3. The process as claimed in claim 1, wherein the inert hydrocarbon solvent is a hydrocarbon having 5 to 12 carbon atoms.

4. The process as claimed in claim 1, wherein the bridged metallocene compound (A) shows Cs symmetry.

5. The process as claimed in claim 1, wherein the bridged metallocene compound (A) is represented by the following formula (II);

[Chem. 2]

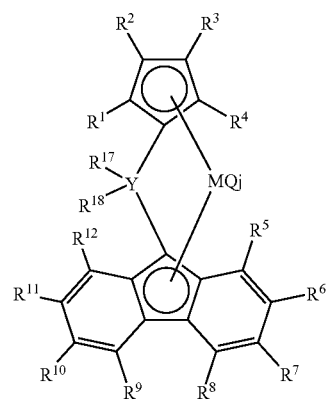
(II)

in which $R^1$, $R^2$, $R^3$, $R^4$, $R^5$, $R^8$, $R^9$ and $R^{12}$ each are selected from hydrogen, a hydrocarbon group, and a silicon atom-containing group and they may be the same or different from each other, and adjacent groups may be bonded to form a ring; $R^6$ and $R^7$ are the same atoms or groups selected from hydrogen, a hydrocarbon group and a silicon atom-containing group, and may be bonded to form a ring; $R^{10}$ and $R^{11}$ are the same atoms or groups selected from hydrogen, a hydrocarbon group and a silicon atom-containing group, and may be bonded to form a ring; $R^6$, $R^7$, $R^{10}$ and $R^{11}$ are not hydrogen atoms simultaneously; $R^{17}$ and $R^{18}$ each are an alkyl group, an aralkyl group, an aryl group or a substituted aryl group, may be identical or different from each other, and may be bonded to form a ring; M is a titanium atom, a zirconium atom or a hafnium atom; Y is a carbon atom or a silicon atom; Q is a combination of identically or differently selected from a halogen atom, a hydrocarbon group, an anion ligand and a neutral ligand coordinatable with a lone electron pair; and j is an integer of 1 to 4.

6. The process as claimed in claim 1, wherein the syndiotactic propylene polymer has a melt flow rate (MFR), as measured at 230° C. under a load of 2.16 kg, of 0.1 to 50 g/10 min.

7. The process as claimed in claim 1, wherein at any position of a transporting line from the polymerization step ($P_1$) to the post-treatment step ($P_2$), the polymer solution (S) is transported by introducing with pressure a hydrocarbon having 5 to 12 carbon atoms.

8. The process as claimed in claim 1, wherein said inert hydrocarbon solvent, which contains at least one hydrocarbon selected from aliphatic hydrocarbons and alicyclic hydrocarbons, is an inert hydrocarbon solvent containing at least 90% by volume of at least one hydrocarbon selected from cyclopentene, n-hexane, isohexane, methylcyclopentane, cyclohexane and n-heptane.

9. The process as claimed in claim 2, wherein said inert hydrocarbon solvent, which contains at least one hydrocarbon selected from aliphatic hydrocarbons and alicyclic hydrocarbons, is an inert hydrocarbon solvent containing at least 90% by volume of at least one hydrocarbon selected from cyclopentene, n-hexane, isohexane, methylcyclopentane, cyclohexane and n-heptane.

10. The process as claimed in claim 3, wherein said inert hydrocarbon solvent, which contains at least one hydrocarbon selected from aliphatic hydrocarbons and alicyclic hydrocarbons, is an inert hydrocarbon solvent containing at least 90% by volume of at least one hydrocarbon selected from cyclopentene, n-hexane, isohexane, methylcyclopentane, cyclohexane and n-heptane.

11. The process as claimed in claim 4, wherein said inert hydrocarbon solvent, which contains at least one hydrocarbon selected from aliphatic hydrocarbons and alicyclic hydrocarbons, is an inert hydrocarbon solvent containing at least 90% by volume of at least one hydrocarbon selected from cyclopentene, n-hexane, isohexane, methylcyclopentane, cyclohexane and n-heptane.

12. The process as claimed in claim 5, wherein said inert hydrocarbon solvent, which contains at least one hydrocarbon selected from aliphatic hydrocarbons and alicyclic hydrocarbons, is an inert hydrocarbon solvent containing at least 90% by volume of at least one hydrocarbon selected from cyclopentene, n-hexane, isohexane, methylcyclopentane, cyclohexane and n-heptane.

13. The process as claimed in claim 1, wherein said inert hydrocarbon solvent, which contains at least one hydrocarbon selected from aliphatic hydrocarbons and alicyclic hydrocarbons, is an inert hydrocarbon solvent containing at least 90% by volume of at least one hydrocarbon selected from cyclopentene, n-hexane, isohexane, methylcyclopentane, cyclohexane and n-heptane.

\* \* \* \* \*